United States Patent
Lei et al.

(10) Patent No.: US 9,960,890 B2
(45) Date of Patent: May 1, 2018

(54) SUPERPOSITION CODING BASED PREAMBLE DESIGNS FOR CO-EXISTING RADIO ACCESS TECHNOLOGIES

(71) Applicant: QUALCOMM Incorporated, San Diego, CA (US)

(72) Inventors: Jing Lei, San Diego, CA (US); Hao Xu, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 15/017,323

(22) Filed: Feb. 5, 2016

(65) Prior Publication Data

US 2016/0248555 A1 Aug. 25, 2016

Related U.S. Application Data

(60) Provisional application No. 62/119,039, filed on Feb. 20, 2015.

(51) Int. Cl.
*H04L 5/00* (2006.01)
*H04W 72/04* (2009.01)
(Continued)

(52) U.S. Cl.
CPC ........ *H04L 5/0005* (2013.01); *H04L 27/0006* (2013.01); *H04L 27/2602* (2013.01);
(Continued)

(58) Field of Classification Search
CPC .............. H04L 5/0005; H04L 27/0006; H04L 27/2602; H04L 27/2613; H04W 16/14;
(Continued)

(56) References Cited

U.S. PATENT DOCUMENTS

2008/0253320 A1\* 10/2008 Piggin .................. H04W 16/14
370/329
2010/0135272 A1\* 6/2010 Dayal .................. H04W 88/10
370/343
(Continued)

OTHER PUBLICATIONS

Broadcom Corporation et al., "Way Forward on Usage of CCA-CA in LAA by Transmission and Detection of Wi-Fi PHY Preamble," 3GPP TSG RAN WG1 #80, Athens, Greece, R1-150788, Feb. 9-13, 2015, 3 pgs., 3rd Generation Partnership Project.
(Continued)

*Primary Examiner* — Walli Butt
(74) *Attorney, Agent, or Firm* — Nerrie M. Zohn

(57) ABSTRACT

Methods, systems, and devices are described for wireless communication at a device. A device may distinguish a preamble sent from a device configured for a first RAT (e.g., WLAN, Wi-Fi, etc.) from a preamble sent from a device configured for a second RAT (e.g., LTE, LTE-A, LTE-U, etc.). A wireless device associated with a second RAT may transmit a dual-use preamble over a contention-based frequency channel. The dual-use preamble may function as a valid preamble for a first RAT and may be received and decoded by devices associated with the first RAT in addition to devices associated with the second RAT. The dual-use preamble may also include a signature associated with the second RAT. The signature may be embedded with the preamble such that it minimizes interference with the valid preamble and be detected by devices associated with the second RAT.

30 Claims, 20 Drawing Sheets

(51) Int. Cl.
*H04W 74/00* (2009.01)
*H04L 27/00* (2006.01)
*H04W 16/14* (2009.01)
*H04W 74/08* (2009.01)
*H04L 27/26* (2006.01)

(52) U.S. Cl.
CPC ......... *H04L 27/2613* (2013.01); *H04W 16/14* (2013.01); *H04W 72/0453* (2013.01); *H04W 74/002* (2013.01); *H04W 74/0816* (2013.01); *H04W 74/004* (2013.01)

(58) Field of Classification Search
CPC ........... H04W 72/0453; H04W 74/002; H04W 74/0816; H04W 74/004
See application file for complete search history.

(56) References Cited

U.S. PATENT DOCUMENTS

| | | | | |
|---|---|---|---|---|
| 2010/0165942 A1* | 7/2010 | Liao | ........................ | H04L 5/005 370/329 |
| 2011/0211561 A1* | 9/2011 | Kiran | .................... | H04L 1/0006 370/335 |
| 2014/0341135 A1 | 11/2014 | Bhushan et al. | | |
| 2016/0095110 A1* | 3/2016 | Li | .................... | H04W 72/1215 370/329 |
| 2016/0135189 A1* | 5/2016 | Chandrasekhar | . | H04W 72/0453 370/329 |
| 2016/0142920 A1* | 5/2016 | Suzuki | .................. | H04W 16/14 370/336 |

OTHER PUBLICATIONS

Huawei et al., "Design of DL Channel Reservation Signal for LBE-based LAA," 3GPP TSG RAN WG1 Meeting #80, Athens, Greece, R1-150046, Feb. 9-13, 2015, 5 pgs., 3rd Generation Partnership Project.

ISA/EPO, International Search Report and Written Opinion of the International Searching Authority, Int'l. App. No. PCT/US2016/016986, dated Jun. 8, 2016, European Patent Office, Rijswijk, NL, 14 pgs.

* cited by examiner

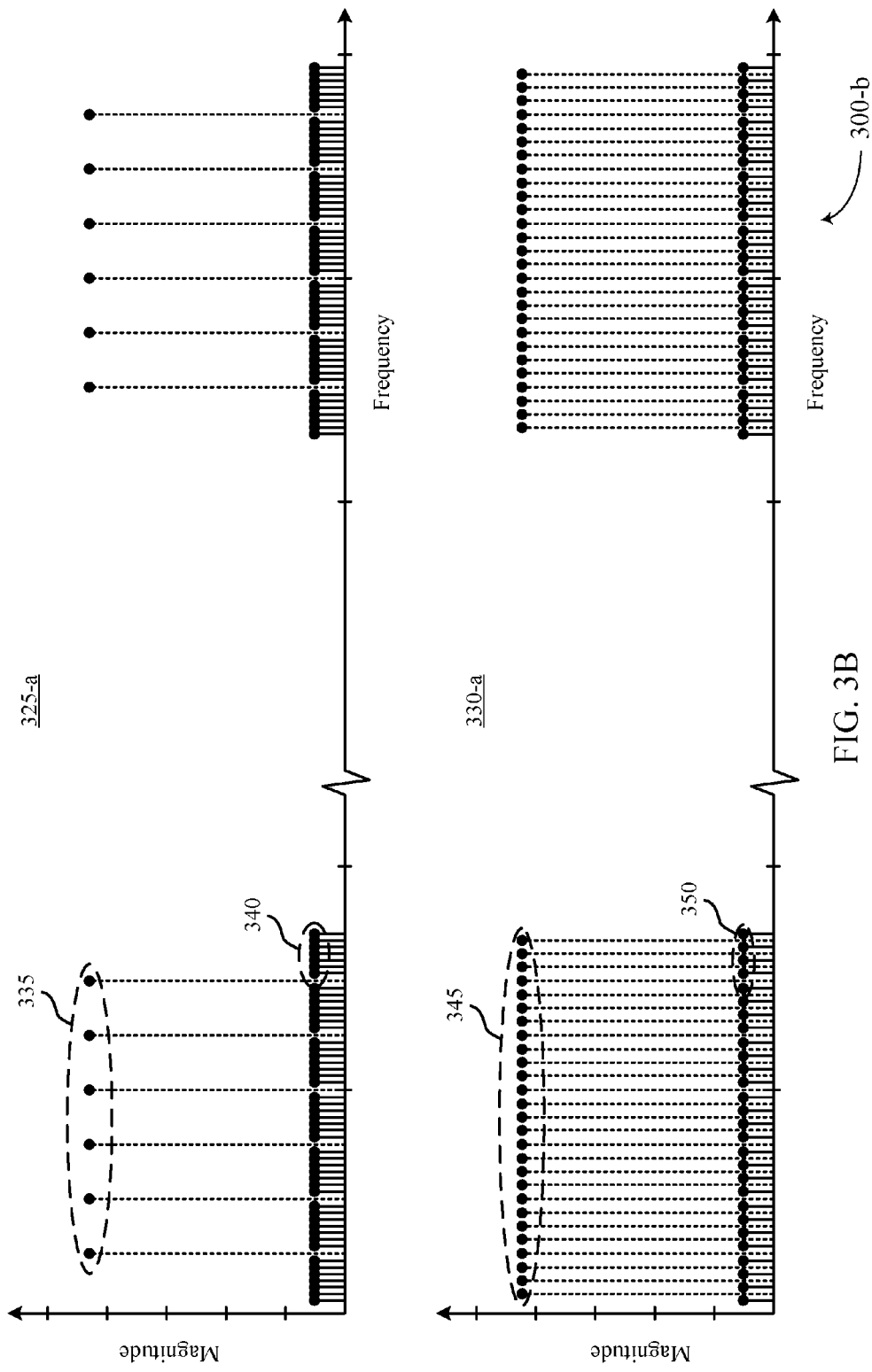

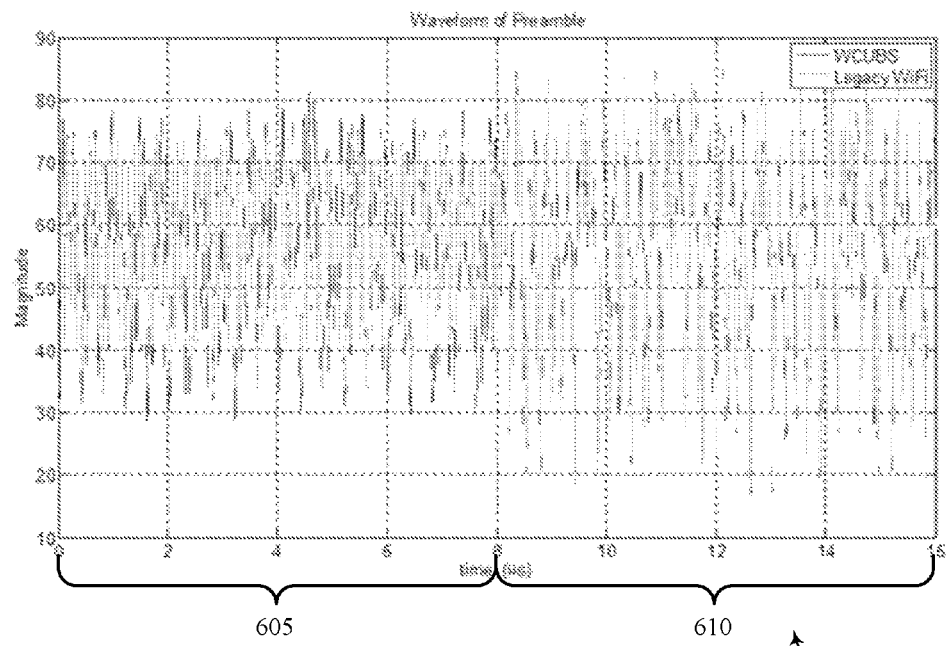
FIG. 6 — 600
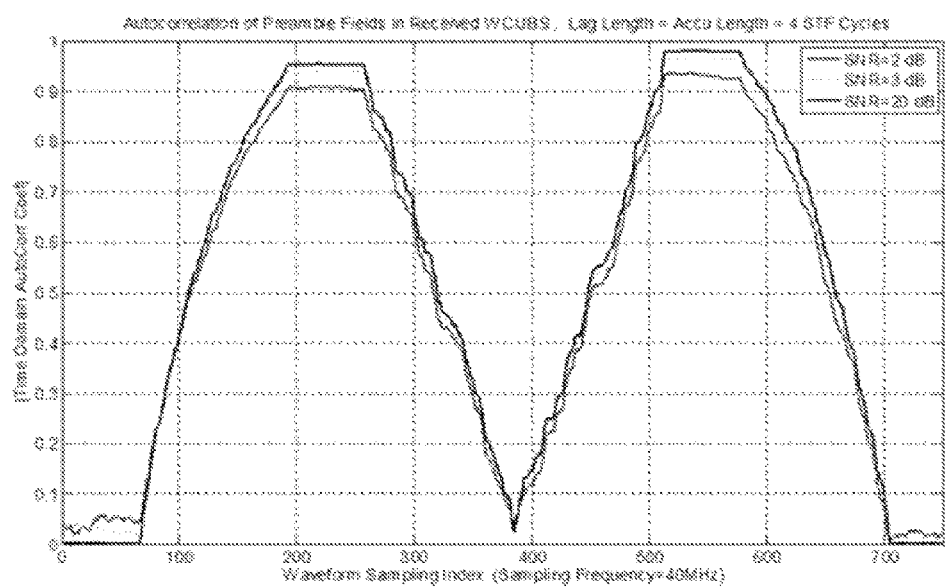
FIG. 7 — 700

SUPERPOSITION CODING BASED PREAMBLE DESIGNS FOR CO-EXISTING RADIO ACCESS TECHNOLOGIES

CROSS REFERENCES

The present application for patent claims priority to U.S. Provisional Patent Application No. 62/119,039 by Lei, et al., entitled "Superposition Coding Based Preamble Design for LTE-U and Wi-Fi Co-Existence," filed Feb. 20, 2015, assigned to the assignee hereof.

BACKGROUND

Field of Disclosure

The following relates generally to wireless communication, and more specifically to superposition coding based preamble designs for co-existing radio access technologies (RATs), which in some examples may include the coexistence of a RAT employing Long Term Evolution (LTE) based protocols (e.g., LTE, LTE-Advanced (LTE-A), LTE-Unlicensed (LTE-U), etc.), and a RAT employing wireless local area network (e.g., Wi-Fi, etc.) protocols.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a first wireless multiple-access communication system may operate according to a first radio access technology (RAT), such as a wireless local area network (WLAN) technology, and may include a number of base stations or access points (APs), each simultaneously supporting communication for multiple mobile devices or stations (STAs). APs may communicate with STAs on downstream and upstream links. A second wireless multiple-access communications system may operate according to a second RAT, such as LTE, and may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). In some cases both types of communication systems may operate in the presence of one another (e.g., may be coexisting) and may both use shared resources of a radio frequency spectrum.

In a wireless local area network (WLAN), such as a Wi-Fi network, an AP may communicate with multiple STAs over a shared radio frequency spectrum band. The STAs may use contention procedures that include transmitting control frames prior to establishing a communication link, such that confirmation of the transmission via an exchange of control frames limits interference experienced by nearby communication devices. One example of such techniques include Request to Send (RTS) and Clear to Send (CTS) messaging, where, for example, an STA attempting to communicate with another device (e.g., another STA or AP), may first send an RTS frame to be received by the device. Once the recipient device receives the RTS frame, the recipient device may confirm the communication link by sending a CTS frame. After the CTS frame is received by the STA, the STA may then begin transmitting data to be received by the recipient device over the shared radio frequency spectrum band. In this way, RTS/CTS messaging can reduce frame collisions by enabling a device, such as a STA or AP, to clear and/or reserve at least a portion of the shared radio frequency spectrum band before transmitting data to an AP or STA.

In an LTE network, a base station and a UE may communicate over a dedicated frequency spectrum band or over different frequency spectrum bands of the radio frequency spectrum (e.g., a dedicated radio frequency spectrum band and a shared radio frequency spectrum band) of a cellular network. With increasing data traffic in cellular networks that use a dedicated (e.g., licensed) radio frequency spectrum band, offloading of at least some data traffic to a shared radio frequency spectrum band may provide a cellular operator with opportunities for enhanced data transmission capacity. A shared radio frequency spectrum band may also provide service in areas where access to a dedicated radio frequency spectrum band is unavailable. In some examples an LTE-U device over a shared radio frequency spectrum band may utilize an unlicensed radio frequency spectrum band, and may be referred to as an LTE-Unlicensed (LTE-U) device.

Prior to gaining access to, and communicating over a shared radio frequency spectrum band, a base station or UE may perform a listen before talk (LBT) procedure to contend for access to the shared radio frequency spectrum band. In some examples the LBT procedure may be compatible with contention procedures used by Wi-Fi devices to gain access to the shared radio frequency spectrum band. An LBT procedure may include performing a clear channel assessment (CCA) procedure to determine whether a channel of the shared radio frequency spectrum band is available. When it is determined that the channel of the shared radio frequency spectrum band is available, a channel usage beacon signal (CUBS) may be transmitted to reserve the channel. A different UE or base station may receive and decode the CUBS and discontinue contention procedures, while a STA or AP may monitor the channel and use energy detection to determine that a CUBS has been transmitted. After identifying the CUBS, other base stations or UEs may utilize resources on the shared radio frequency spectrum band that are not being used by the transmitting UE. After determining the detected energy is above a threshold, Wi-Fi devices may refrain from transmitting on the channel for a period of time. However, other Wi-Fi devices using resources of the channel may not determine that the energy of the CUBS does not exceed a threshold, or may not receive the CUBS at all. These other Wi-Fi devices may thus continue using the channel, or one or more interfering channels (e.g., an overlapping or adjacent channel), in a manner that interferes with the base station's or UE's reservation and use of the channel.

In some examples, a base station or UE may provide communications which rely on the increased sensitivity of a Wi-Fi device's signal reception and decoding circuit over the Wi-Fi device's energy detection circuit. In some examples, the energy detection circuit of a Wi-Fi device may be less sensitive than the signal reception and decoding circuit used for detecting Wi-Fi transmissions (e.g., Wi-Fi preambles, CTS-to-Self packets, Wi-Fi data packets, etc.). The base station or UE may thus transmit a channel reservation indication to be interpreted by the reception and decoding circuits of Wi-Fi devices. A channel reservation indication transmitted in this manner may be detected by the Wi-Fi devices in scenarios in which the energy level of a CUBS may not be detectable. However, if an LTE-U device transmits a Wi-Fi preamble, the other LTE-U devices within range may be unable to distinguish a Wi-Fi preamble sent from a Wi-Fi device from a channel reservation indicator sent from an LTE-U device. Therefore, an LTE-U device may not utilize the unused resources on the channel of the shared radio frequency spectrum band, resulting in an inefficient utilization of resources of the shared radio frequency spectrum band.

SUMMARY

Systems, methods, and apparatuses for superposition coding for a preamble used for channel reservation in a shared radio frequency spectrum band are described. A device may distinguish a preamble sent from a device configured for a first RAT (e.g., WLAN, Wi-Fi, etc.) from a preamble sent from a device configured for a second RAT (e.g., LTE, LTE-A, LTE-U, etc.). In some examples a wireless device associated with (e.g., employing, capable of employing, etc.) the second RAT may transmit a dual-use preamble over a contention-based frequency channel (e.g., a channel of a shared radio frequency spectrum band). The dual-use preamble may function as a valid preamble for a first RAT and may be received and decoded by devices associated with the first RAT in addition to devices associated with the second RAT. The dual-use preamble may also include a signature associated with the second RAT for detection by devices associated with the second RAT. The signature may be embedded with the preamble such that it minimizes interference with the valid preamble. A first set of devices, associated with the first RAT, may receive the dual-use preamble and back off from contention procedures for the medium. The second set of devices, associated with the second RAT, may also receive the dual-use preamble, and further process the dual-use preamble to determine whether a signature has been embedded with the preamble. The second set of devices may employ the embedded signature to differentiate between a preamble associated with the first RAT, and a dual-use preamble identifiable by both the first RAT and second RAT. In some examples the first set of devices may also further process the dual-use preamble to identify the signature, and use the identified signature to take various steps in response to the identification. For example, the first set of devices may use such an identification to avoid further processing of communications employing the second RAT.

A method of wireless communication is described. The method may include generating a preamble signal having a superposition of a first set of symbols and a second set of symbols, wherein the first set of symbols correspond to a preamble sequence associated with a first radio access technology (RAT) and the second set of symbols correspond to a signature associated with a second RAT, and wherein the first set of symbols is identifiable to both the first RAT and the second RAT and the second set of symbols is identifiable to the second RAT, and transmitting the preamble signal over a frequency channel shared by the first RAT and the second RAT.

An apparatus for wireless communication is described. The apparatus may include means for generating a preamble signal having a superposition of a first set of symbols and a second set of symbols, wherein the first set of symbols correspond to a preamble sequence associated with a first radio access technology (RAT) and the second set of symbols correspond to a signature associated with a second RAT, and wherein the first set of symbols is identifiable to both the first RAT and the second RAT and the second set of symbols is identifiable to the second RAT, and means for transmitting the preamble signal over a frequency channel shared by the first RAT and the second RAT.

Another apparatus for wireless communication is described. The apparatus may include a processor, memory in electronic communication with the processor, and instructions stored in the memory and operable, when executed by the processor, to cause the apparatus to generate a preamble signal having a superposition of a first set of symbols and a second set of symbols, wherein the first set of symbols correspond to a preamble sequence associated with a first radio access technology (RAT) and the second set of symbols correspond to a signature associated with a second RAT, and wherein the first set of symbols is identifiable to both the first RAT and the second RAT and the second set of symbols is identifiable to the second RAT, and transmit the preamble signal over a frequency channel shared by the first RAT and the second RAT.

A non-transitory computer-readable medium storing code for wireless communication is described. The code may include instructions executable to generate a preamble signal having a superposition of a first set of symbols and a second set of symbols, wherein the first set of symbols correspond to a preamble sequence associated with a first radio access technology (RAT) and the second set of symbols correspond to a signature associated with a second RAT, and wherein the first set of symbols is identifiable to both the first RAT and the second RAT and the second set of symbols is identifiable to the second RAT, and transmit the preamble signal over a frequency channel shared by the first RAT and the second RAT.

In some examples of the method, apparatuses, or non-transitory computer-readable medium, generating the preamble signal may include steps, features, means, or instructions for performing a frequency domain superposition of the first set of symbols and the second set of symbols to obtain a frequency domain signal, and performing a frequency domain to time domain transform on the frequency domain signal. Additionally or alternatively, some examples may include steps, features, means, or instructions for applying a gain ratio to the second set of symbols prior to the performing the frequency domain superposition.

In some examples of the method, apparatuses, or non-transitory computer-readable medium described herein, performing the frequency domain superposition may include mapping the first set of symbols to a first set of subcarriers associated with pilot symbols for the preamble sequence within the shared frequency channel, and mapping the second set of symbols to a second set of subcarriers within the shared frequency channel, the second set of subcarriers including one or more subcarrier frequencies in between respective subcarriers of the first set of subcarriers. Additionally or alternatively, in some examples the first set of subcarriers may include a subset of subcarriers having a first subcarrier spacing associated with transmissions via the first RAT, the second set of subcarriers may include one or more subcarriers having a second subcarrier spacing smaller than the first subcarrier spacing.

In some examples of the method, apparatuses, or non-transitory computer-readable medium described herein, generating the preamble signal may include steps, features, means, or instructions for resampling the preamble signal to a sampling frequency associated with transmissions of the second RAT. Additionally or alternatively, in some examples the sampling frequency may be different than the sampling frequency associated with transmissions of the first RAT.

In some examples of the method, apparatuses, or non-transitory computer-readable medium described herein, the signature may be selected from a set of predefined signatures having low cross-correlations with each other. Additionally or alternatively, in some examples the selecting the signature from the set of predefined signatures may be based at least in part on a device identifier associated with a transmitter device for the second RAT, a cell identifier associated with a cell of the second RAT, a supported release version of the second RAT, a power class of the transmitter device, a transmission length, a public land mobile network ID, a channel number or any combination thereof.

In some examples of the method, apparatuses, or non-transitory computer-readable medium described herein, the set of predefined signatures may include Chu sequences. Additionally or alternatively, some examples may include steps, features, means, or instructions for generating the signature based at least in part on a pseudo-noise (PN) function.

In some examples of the method, apparatuses, or non-transitory computer-readable medium described herein, a transmit power for the transmitting may be selected based at least in part on a predefined transmit power level for the preamble sequence for the first RAT. Additionally or alternatively, in some examples the first RAT may include a wireless local area network (WLAN) RAT and the first set of symbols may include pilot symbols for one or both of a short training field (STF) or a long training field (LTF) for the WLAN RAT, and wherein the second RAT comprises an LTE RAT or an LTE-A RAT.

A method of wireless communication is described. The method may include receiving a preamble signal transmitted over a shared frequency channel, the preamble signal having a predetermined preamble time duration associated with a first radio access technology (RAT), the preamble signal having a first set of symbols corresponding to a preamble sequence associated with the first RAT and a second set of symbols corresponding to a signature associated with the second RAT, and determining that a transmitter device associated with the received preamble signal is associated with the second RAT based at least in part on identifying the signature in the received preamble signal.

An apparatus for wireless communication is described. The apparatus may include means for receiving a preamble signal transmitted over a shared frequency channel, the preamble signal having a predetermined preamble time duration associated with a first radio access technology (RAT), the preamble signal having a first set of symbols corresponding to a preamble sequence associated with the first RAT and a second set of symbols corresponding to a signature associated with the second RAT, and means for determining that a transmitter device associated with the received preamble signal is associated with the second RAT based at least in part on identifying the signature in the received preamble signal.

Another apparatus for wireless communication is described. The apparatus may include a processor, memory in electronic communication with the processor, and instructions stored in the memory. The instructions may be operable, when executed by the processor, to cause the apparatus to receive a preamble signal transmitted over a shared frequency channel, the preamble signal having a predetermined preamble time duration associated with a first radio access technology (RAT), the preamble signal having a first set of symbols corresponding to a preamble sequence associated with the first RAT and a second set of symbols corresponding to a signature associated with the second RAT, and determine that a transmitter device associated with the received preamble signal is associated with the second RAT based at least in part on identifying the signature in the received preamble signal A non-transitory computer-readable medium storing code for wireless communication is described. The code may include instructions executable to receive a preamble signal transmitted over a shared frequency channel, the preamble signal having a predetermined preamble time duration associated with a first radio access technology (RAT), the preamble signal having a first set of symbols corresponding to a preamble sequence associated with the first RAT and a second set of symbols corresponding to a signature associated with the second RAT, and determine that a transmitter device associated with the received preamble signal is associated with the second RAT based at least in part on identifying the signature in the received preamble signal.

In some examples of the method, apparatuses, or non-transitory computer-readable medium described herein, determining that the transmitter device is associated with the second RAT may include steps, features, means, or instructions for sampling the received preamble signal at a first sampling rate associated with transmissions of the second RAT, and resampling the received preamble signal at a second sampling rate associated with preamble transmissions of the first RAT. In some examples the sampling and/or resampling may be followed by identifying the first set of symbols, and/or correlating the received preamble signal to the signature.

In some examples of the method, apparatuses, or non-transitory computer-readable medium described herein, identifying the signature in the received preamble signal may include steps, features, means, or instructions for performing a frequency domain correlation of the received preamble signal to the signature associated with the second RAT. In some examples, performing the frequency domain correlation may include comparing the frequency domain correlation to a threshold. Additionally or alternatively, in some examples the threshold may be determined based at least in part on a signal-to-noise ratio (SNR) or a signal-to-interference-plus-noise ratio (SINR) of the received preamble signal.

Some examples of the method, apparatuses, or non-transitory computer-readable medium described herein may further include steps, features, means, or instructions for determining that the transmitter device associated with the received preamble signal is associated with the first RAT if the correlating does not identify the signature in the received preamble signal. Additionally or alternatively, in some examples the first set of symbols may include pilot symbols for one or both of a short training field (STF) or a long training field (LTF) for a wireless local area network (WLAN) RAT, and determining that the transmitter device associated with the received preamble signal is associated with the second RAT may be based at least in part on identifying the second set of symbols in the STF, the LTF, or any combination thereof.

The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3B illustrates an example of a channel structure that supports superposition coding based preamble designs, in accordance with aspects of the present disclosure;

FIG. 6 provides a graph that illustrates a comparison of a W-CUBS with a Wi-Fi preamble, in accordance with aspects of the present disclosure;

FIG. 7 provides a graph that illustrates a correlation of a W-CUBS with a Wi-Fi preamble, in accordance with aspects of the present disclosure;

DETAILED DESCRIPTION

Figure 1:
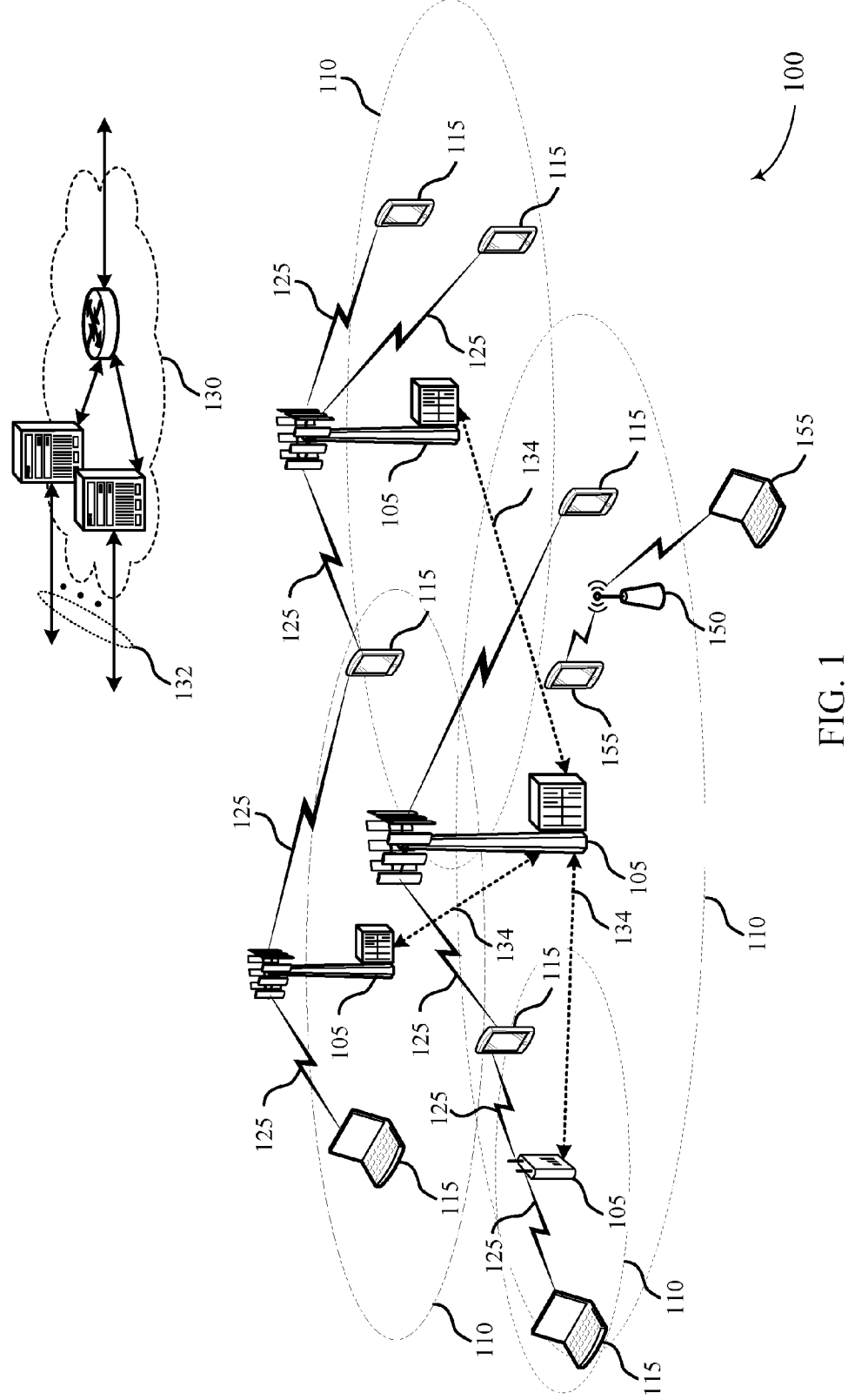
FIG. 1 illustrates an example of a wireless communications system in which superposition coding based preamble designs may be employed, in accordance with aspects of the present disclosure.

The described features generally relate to improved systems, methods, or apparatuses for superposition coding for a preamble signal used for channel reservation in an shared radio frequency spectrum band (e.g., an unlicensed radio frequency spectrum band, a licensed radio frequency spectrum band having more than one licensed operator, a licensed radio frequency spectrum band providing for opportunistic sharing of resources of the licensed radio frequency spectrum band, etc.). Generally, operators of cellular networks (e.g., an LTE/LTE-A network, etc.) use fixed channel assignment in dedicated (e.g., licensed) radio frequency spectrum bands. With increasing data traffic in cellular networks that use dedicated radio frequency spectrum bands, offloading of at least some data traffic to a shared radio frequency spectrum band may provide a cellular operator (e.g., an operator employing a coordinated set of base stations defining a cellular network, such as an LTE/LTE-A network) with opportunities for enhanced data transmission capacity. For example, the shared radio frequency spectrum band may be used to alleviate heavy traffic in a dedicated radio frequency spectrum band or to increase throughput using carrier aggregation. Using LTE technology in a shared radio frequency spectrum band (which may be referred to as LTE-U, in some examples) may provide performance gains over using WLAN technologies (e.g., Wi-Fi, etc.). For instance, LTE protocols may utilize a more spectrally efficient physical (PHY) layer design. In addition, LTE protocols may use a more efficient media access control (MAC) layer design that allows multiple devices to access a channel of a radio frequency spectrum band simultaneously. WLAN protocols, on the other hand, may operate in a time division multiplexing (TDM) manner in which devices avoid transmitting over the channel at the same time.

Determining how to efficiently share resources between the different technologies may present challenges for wireless communication systems. An LTE-U device (e.g., a device employing LTE-based protocols in a shared radio frequency spectrum band) may employ a clear channel assessment (CCA) to identify whether a channel is occupied, and subsequently transmit a preamble to reserve the channel when the channel is clear. In one example, the LTE-U device may transmit an LTE-specific preamble (e.g., a channel usage beacon signal (CUBS), etc.) to reserve the channel. Other LTE-U devices operating in the shared radio frequency spectrum band may be able to receive and decode the CUBS to determine that a device has reserved the channel. WLAN devices (e.g., devices employing WLAN protocols in the shared radio frequency spectrum band) may also be able to detect the CUBS using energy level detection. The WLAN devices may back off the channel if a CUBS is detected.

In some cases, multiple radio access technologies may coexist in an unfavorable manner (e.g., having unequal sharing of a radio frequency spectrum band, signaling incongruities, high levels of interference, etc.) For instance, if an LTE-U device fails to inform neighboring WLAN devices within a transmission range that a channel of a shared radio frequency spectrum band is reserved, the neighboring WLAN devices may also attempt to use the channel. For example, if an LTE-specific preamble (e.g., CUBS, etc.) is only detectable by WLAN devices using energy detection, the range of detection for such a preamble may be less than is desired to prevent harmful interference.

In accordance with various aspects of the present disclosure, an LTE-U device may transmit an enhanced WLAN preamble (e.g., W-CUBS, which may refer to a preamble signal that includes a WLAN preamble also performing the function of a CUBS, etc.) before utilizing resources of a channel of a shared radio frequency spectrum band. The W-CUBS may provide LTE-U devices an ability to more favorably co-exist with WLAN devices on a shared radio frequency spectrum band, and may be compliant with existing standards (e.g., IEEE 802.11 standards, etc.). For example, a preamble detection level for a valid WLAN preamble, such as the W-CUBS, may be significantly lower than an energy detection level for a preamble that is non-compliant (e.g., the preamble detection level may be −90 dBm while the energy detection level may be −62 dBm). In some examples the W-CUBS may be based on a Wi-Fi orthogonal frequency-division multiplexing (OFDM) structure with a sampling frequency of 40 MHz, and may include three preamble fields and one CTS-to-Self field. The W-CUBS may be resampled at 30.72 MHz to be processed with other LTE-based signals and may be scheduled after an LTE-U device has performed a successful CCA or enhanced CCA (eCCA). Because of the frequency structure of the W-CUBS, it may be received and/or resampled at 40 MHz for preamble detection or data demodulation (e.g., by WLAN devices).

LTE-U devices may be configured to distinguish a W-CUBS from a WLAN preamble sent from a WLAN device. The enhanced WLAN preamble may include a superimposed LTE-U signature, wherein the superimposed LTE-U signature may be any signature identifiable by other LTE-U devices. In some cases, the W-CUBS may include a superposition of a Wi-Fi preamble (e.g., a Wi-Fi preamble waveform, a set of Wi-Fi preamble symbols, etc.) and an LTE-U signature (e.g., an LTE-U signature waveform, a set of LTE-U signature symbols, etc.).

The LTE-U signature may include a specific sequence, such as a Chu sequence, a pseudorandom noise (PN) sequence, or other sequences, for example. An LTE-U signature may be selected to enhance complexity or correlation properties. In some examples, each LTE-U device may use the same signature (e.g., the same sequence, etc.). In other examples, each LTE-U device may select a signature from a set of predefined signatures independently from other LTE-U devices. In some examples the LTE-U device may select an LTE-U signature to convey information such as device ID, release version, power class, transmission length, etc. The LTE-U signature may be embedded in an STF, LTF, or both to enable joint detection of the LTE-U signature. In some examples the LTE-U signature may also be embedded in an enhanced WLAN preamble field, which may be referred to as a W-SIG, to improve detectability. In some examples the embedding may be configured to reduce a likelihood of improper detections and/or interference with a WLAN preamble, and in some examples the signature may be selected to increase the likelihood of detection for the signature.

A WLAN preamble may use significantly larger subcarrier spacing (e.g., 312.5 kHz) than subcarrier spacing used by LTE-based protocols (e.g., 15 kHz). This may allow an LTE-U device to transmit using interstitial subcarriers that do not interfere with pilots in the WLAN preamble. The LTE-U signature may additionally be chosen to maintain orthogonality with the WLAN pilots or to meet other constraints, such as a spectral mask requirement and/or an avoidance of a zero frequency or center frequency subcarrier.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in which superposition coding based preamble designs may be employed, in accordance with aspects of the present disclosure. The wireless communications system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, devices of the wireless communications system 100 may employ protocols according to LTE or LTE-Advanced (LTE-A) technologies. In LTE or LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the PHY layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, some devices of the wireless communications system 100 may operate according to a first radio access technology (e.g., a WLAN technology, Wi-Fi, etc.), but operate in the presence of one or more networks or nodes operating according to a second radio access technology (e.g., a wireless wide area network (WWAN) operating according to LTE-based cellular radio access technology, etc.). By way of example, FIG. 1 shows a network comprised of a Wi-Fi access point (AP) 150 in communication with Wi-Fi stations (STAs) 155. In some examples, a UE 115 or base station 105 may support operations employing LTE protocols in a shared radio frequency spectrum band such as a band used by Wi-Fi devices such as AP 150 and STAs 155. A STA 155 and/or AP 150 may be Wi-Fi devices that may support LTE protocols for operation in licensed frequency bands, but may not be configured for LTE-based protocol operation in shared radio frequency spectrum bands. In the interest of clarity, devices capable of operating according to LTE-based protocols in shared radio frequency spectrum bands may be referred to as base stations 105 or UEs 115, and devices that are not capable of operating according to LTE-based protocols in shared radio frequency spectrum bands may be referred to as APs 150 or STAs 155 (e.g., whether or not they support LTE in licensed frequency bands).

In some cases, shared radio frequency spectrum bands may, by way of regulation or agreement among device manufacturers, be divided into multiple channels, where each channel may have a predefined bandwidth (e.g., 20 MHz, etc.). Before transmitting over a shared channel (e.g., channel of a shared radio frequency spectrum band), a base station 105 or UE 115 may perform CCA procedures to determine if the shared channel is available. If the base station 105 or UE 115 determines the channel is available, it may transmit a preamble signal to reserve the channel. Preamble signals transmitted by an LTE-U device in accordance with LTE-based protocols (e.g., CUBS, etc.) may impact coexistence with WLAN devices while preamble signals transmitted in accordance with WLAN protocols may provide better coexistence with WLAN devices at the expense of reduced opportunities for LTE-U devices to share resources.

The devices of wireless communications system 100, including the base stations 105 or UEs 115, may transmit an enhanced WLAN preamble (e.g., W-CUBS) that is detectable by other WLAN devices as a WLAN preamble, while also conveying an LTE-U signature that LTE-U devices may detect to identify the transmission as from another LTE-U device. In some examples the W-CUBS may include a superposition of the LTE-U signature with the WLAN preamble, and may be configured for low, or otherwise acceptable interference (e.g., an estimated interference between the LTE-U signature and WLAN preamble being below a threshold, etc.) with the WLAN preamble (e.g., by frequency mapping to interstitial frequency resources, etc.). The STAs 155 or AP 150 may receive the W-CUBS, including the WLAN preamble, and back off from contention procedures for the medium (e.g., according to WLAN protocols). A UE 115 may receive the W-CUBS, including the WLAN preamble, and further process the W-CUBS to determine whether an LTE-U signature has been superimposed with the WLAN preamble. The UE 115 may use the LTE-U signature to differentiate the W-CUBS as sent from a UE 115 or a base station from a WLAN preamble sent from a STA 155 or AP 150, which does not include the LTE-U signature.

Figure 2:
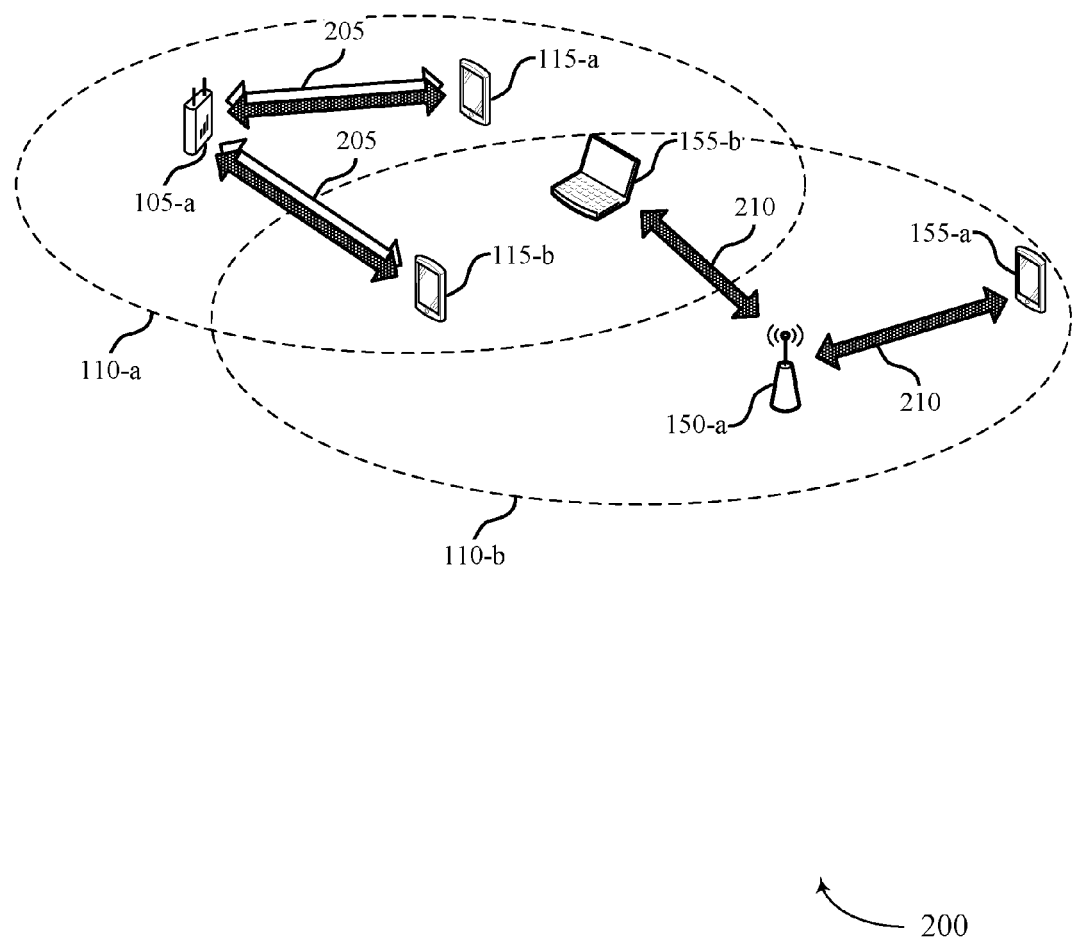
FIG. 2 illustrates an example of a wireless communications environment in which superposition coding based preamble designs may be employed, in accordance with aspects of the present disclosure.

FIG. 2 illustrates an example of a wireless communication environment 200 in which superposition coding based preamble designs may be employed, in accordance with aspects of the present disclosure. Base station 105-*a*, UE 115-*a*, and UE 115-*b* may communicate with one another using a dedicated radio frequency spectrum band, a shared radio frequency spectrum band, or both via communication links 205. AP 150-*a*, STA 155-*a*, and STA 155-*b* may communicate with one another using the shared radio frequency spectrum band via WLAN communication links 210. In one example, UE 115-*a*, UE 115-*b*, and base station 105-*a* may be LTE-U capable devices and STA 155-*a*, STA 155-*b*, and AP 150-*a* may be Wi-Fi devices.

UE 115-*a* may operate using either or both of the dedicated and shared radio frequency spectrum bands via communication link 205. UE 115-*a* may perform a CCA to determine if the shared radio frequency spectrum band is occupied by other transmitting devices. As described above, use of an LTE-specific preamble (e.g., CUBS) may not be effective in wireless communication environment 200 in reducing unfavorable interference for coexistence of devices employing LTE-based protocols and devices employing WLAN-based protocols using the shared radio frequency spectrum band.

To address issues that may arise when using LTE-specific preambles in a shared radio frequency spectrum band, LTE-U devices, such as UE 115-*a*, may transmit an enhanced WLAN preamble (e.g., W-CUBS) that is detectable by WLAN devices as a valid WLAN preamble, and also conveys an LTE-U signature. The transmission of a W-CUBS may follow, for example, a successful CCA over a shared channel. In some cases, the W-CUBS may include a WLAN preamble and an embedded LTE-U signature. UE 115-*a*, UE 115-*b*, base station 105-*a*, STA 155-*a*, STA 155-*b*, and AP 150-*a* may each be capable of receiving and decoding the WLAN preamble of the W-CUBS, while the LTE-U signature of the W-CUBS may be detected by LTE-U devices (e.g., UE 115-*a*, UE 115-*b*, base station 105-*a*, etc.). In some examples, the W-CUBS may include a superposition of the LTE-U signature with the WLAN preamble.

In some examples, circuitry used by a WLAN device to receive and decode a WLAN preamble may be more sensitive than energy detection circuitry used to detect transmissions on a channel. In such examples, other LTE-U devices and other WLAN devices, including STA 155-*a*, may receive and decode the valid WLAN preamble in the W-CUBS and back off from accessing the shared channel for a time period. In addition to backing off, UE 115-*b* or base station 105-*a* may further process the W-CUBS to detect a superimposed LTE-U signature. The LTE-U signature may be used to inform UE 115-*b* and base station 105-*a* that the W-CUBS is being transmitted by another LTE-U device. In some cases the LTE-U signature may include or indicate LTE-specific information such as device ID, release version, transmission length, power class, cell ID, public land mobile network (PLMN) ID, channel number, and the like. Detecting the LTE-U signature may enable UE 115-*b* to simultaneously access the shared radio frequency spectrum band with UE 115-*a* according to various techniques associated with LTE-based protocols.

Figure 3A:
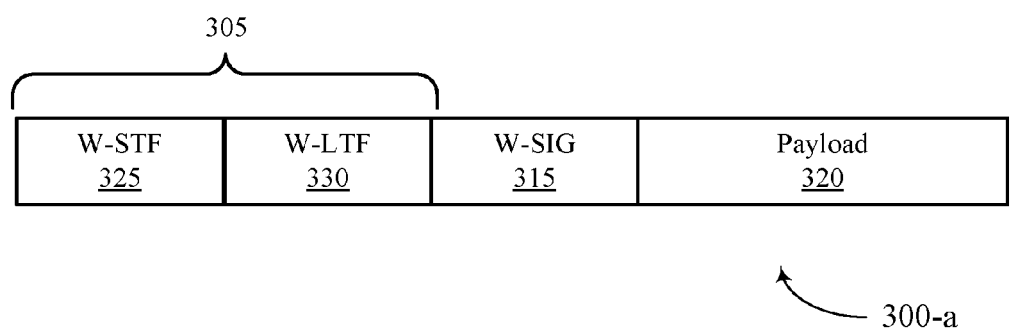
FIG. 3A illustrates an example of an LTE frame that supports superposition coding based preamble designs, in accordance with aspects of the present disclosure.

FIG. 3A illustrates a block diagram of an LTE frame 300-*a* that supports superposition coding based preamble designs, in accordance with aspects of the present disclosure. LTE frame 300-*a* may include a W-STF field 325, a W-LTF field 330, a W-SIG field 315, and payload field 320. An LTE-U signature may be embedded, for example, in a region 305 that includes the W-STF field 325 and the W-LTF field 330. The region 305 may correspond to the W-CUBS of the LTE frame 300-*a*. However, the W-CUBS may include other fields, in some cases.

The W-STF field 325 may include a WLAN preamble (e.g., a Wi-Fi preamble) utilizing 12 subcarriers, and may last 8 μs in time. The W-STF field 325 may repeat a short training symbol with a periodicity of 0.8 μs and may use the symbols for correlation in the time domain. The W-STF field 325 may be used by a WLAN device for packet detection. The W-STF field 325 may additionally include the superposition of an LTE-U signature. The LTE-U signature may be embedded into the W-STF field 325 in such a way that interference between the short training symbols and the LTE-U signature symbols is minimized, or is otherwise below an acceptable threshold (e.g., an estimated interference between the LTE-U signature and the short training symbols being below a maximum threshold, etc.). In some cases, a transmission employing LTE protocols may use tighter subcarrier spacing than a subcarrier spacing used for the short training symbols. Therefore, subcarriers used by the LTE-U signature symbols may not overlap with the subcarriers used by the STF symbols.

The W-LTF field 330 may include a WLAN preamble utilizing up to 52 subcarriers, and may also last 8 µs in time. The W-LTF field 330 may employ two 3.2 µs long training symbols prepended by a 1.6 µs cyclic prefix. The WLAN preamble of W-LTF field 330 may be used for channel reservation and may also be used to determine frequency offsets and channel estimates. The W-LTF field 330 may additionally include the superposition of an LTE-U signature. The LTE-U signature may be embedded into the W-LTF field 330 in such a way that interference between the long training symbols and the LTE-U signature symbols is minimized, or is otherwise below an acceptable threshold. In some cases, a transmission employing LTE-based protocols may use tighter subcarrier spacing than a subcarrier spacing used for the long training symbols and the subcarriers used by the LTE-U signature symbols may not overlap with the subcarriers used by the LTF symbols.

The W-SIG field 315 may consist of 24 information bits and may include a 3.2 µs symbol and a 0.8 µs cyclic prefix to last a total of 4 µs. The W-SIG field 315 may use 52 subcarriers, 48 of which are for coded bits and 4 of which are for pilot signals. The W-SIG field 315 may be used to configure the receiver by communicating the modulation and coding scheme (MCS) and the length of data to be communicated. The W-SIG field 315 may also include a parity bit and tail bits to flush the encoder and decoder before the data field is decoded. In some examples, to improve a likelihood of detection, an LTE-U signature included in the W-STF field 325 or the W-LTF field may be repeated in the W-SIG field 315, such as an inclusion of the LTE-U signature by way of superposition as described herein.

The payload field 320 may be used to communicate data or control information. For instance, a CTS-to-Self frame may be included in the payload field 320. A CTS-to-Self frame may direct devices employing WLAN protocols within range of the LTE frame 300-a to back off of the channel (e.g., not continue contending for access for a time period, etc.). The fields described with reference to FIG. 3A may be compatible with WLAN protocols and may be interpreted as a valid WLAN preamble or control frame. Therefore, devices employing WLAN protocols may receive and decode various fields of LTE frame 300-a and adjust operations accordingly.

FIG. 3B illustrates an example of a channel structure 300-b that supports superposition coding based preamble designs, in accordance with aspects of the present disclosure. Channel structure 300-b may include W-STF field 325-a and W-LTF field 330-a, which may be frequency domain representations of W-STF field 325 and W-LTF field 330 described with reference to FIG. 3A. The W-STF field 325-a may include STF pilots 335 and a first set of LTE-U signature pilots 340, and the W-LTF field 330-a may include LTF pilots 345 and a second set of LTE-U signature pilots 350. The first set of LTE-U signature pilots 340 and/or the second set of LTE-U signature pilots 350 may be associated with an LTE-U signature, while the STF pilots 335 and LTF pilots 345 may be associated with a valid WLAN preamble. Channel structure 300-b may be an example of a frequency domain representation of a W-CUBS.

Channel structure 300-b may, for example, allocate 12 subcarriers to the STF pilots 335 and 52 carriers to the LTF pilots 345. The subcarrier spacing used by the STF pilots 335 and LTF pilots 345 (e.g., 312.5 kHz, according to Wi-Fi protocols) may be significantly wider than a subcarrier spacing used by LTE protocols (e.g., 15 kHz). This may allow an LTE-U device to select subcarriers for the first set of LTE-U signature pilots 340 and the second set of LTE-U signature pilots 350 at intervals that do not overlap with subcarriers selected for STF pilots 335 or LTF pilots 345. The first set of LTE-U signature pilots 340 and the second set of LTE-U signature pilots 350 may, thus, be embedded with the STF pilots 335 and the LTF pilots 345, respectively. In some cases, either the first set of LTE-U signature pilots 340 may be included in the W-STF field 325-a, or the second set of LTE-U signature pilots 350 may be included in the W-LTF field. In other examples, the first set of LTE-U signature pilots 340 may be included in the W-STF field 325-a, and additionally the second set of LTE-U signature pilots 350 may be included in the W-LTF field 330-a, which may allow a receiver employing LTE protocols to jointly detect the LTE-U signature sequence (e.g., the first set of LTE-U signature pilots 340 and the second set of LTE-U signature pilots 350) to reduce false alarm indications and increase the probability of detection.

An LTE-U signature may be chosen based on the frequency resolution associated with the STF pilots 335 and LTF pilots 345. For example, the W-STF field 325-a and W-LTF field 330-a may each last up to 8 µs in time. This may provide a frequency resolution that is bounded by $\Delta f = \frac{1}{8}$ Mhz. The number of samples, N, that may be taken within 8 µs may be determined by the equation $N = f_s/\Delta f$. A WLAN device may sample at a sampling frequency, $f_s = 40$ Mhz, and the maximum number of samples, N, may be equal to 320. In some cases, a Fast Fourier Transform (FFT) of size N=256 may be used and the frequency resolution may be $\Delta f = 156.2$ kHz, which may be half the frequency resolution associated with the WLAN protocols. The first set of LTE-U signature pilots 340 and the second set of LTE-U signature pilots 350 may, thus, be spread across subcarriers spaced at 156.2 kHz intervals, and in some examples may not be transmitted over those frequencies that are allocated to the STF pilots 335 and LTF pilots 345. The spacing used for subcarriers employed for the first set of LTE-U signature pilots 340 and/or the second set of LTE-U signature pilots 350 may preserve orthogonality to the STF pilots 335 and LTF pilots 345. The spacing of subcarriers employed for transmitting LTE-U signature pilots may also preserve the property of pseudo noise to maintain a flat and wide spectrum, and may also produce autocorrelation peaks and valleys. The LTE-U signature may additionally be chosen to meet other constraints, such as a spectral mask requirement and/or avoidance of a zero frequency or center frequency subcarrier.

Figure 4:
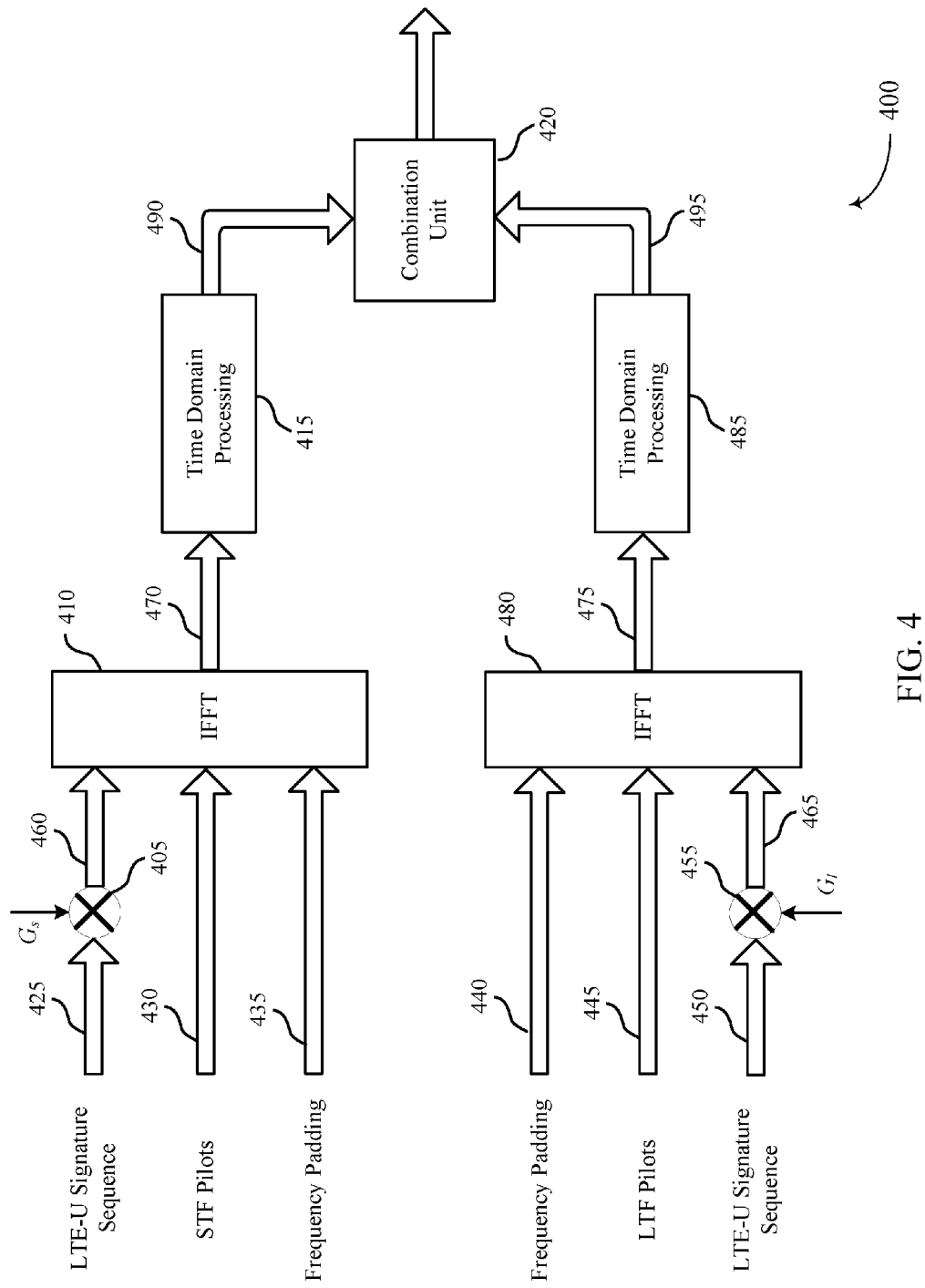
FIG. 4 illustrates an example flow chart for superposition coding for a preamble, in accordance with aspects of the present disclosure.

FIG. 4 illustrates an example flow chart 400 for superposition coding for a preamble, in accordance with aspects of the present disclosure. Flow chart 400 may illustrate aspects of superposition coding and may be implemented in a UE 115 or base station 105 as described above with reference to FIGS. 1 and 2. In some examples, a device, such as a UE 115 or base station 105, may generate an enhanced WLAN preamble with an embedded LTE-U signature and multiplex the preamble with other fields to construct a W-CUBS signal.

A device may generate a first set of symbols 430 corresponding to STF pilot symbols for a WLAN preamble (e.g., Wi-Fi STF pilot symbols, etc.). The device may also generate a second set of symbols 425 corresponding to a first LTE-U signature. Similarly, a device may generate a third set of symbols 445 corresponding to LTF pilot symbols for a WLAN preamble (e.g., Wi-Fi LTF pilot symbols, etc.). The device may also generate a fourth set of symbols 450 corresponding to second LTE-U signature, which may be the same as or different from the first LTE-U signature.

An LTE-U signature sequence (e.g., the first LTE-U signature sequence and/or the second LTE-U signature sequence, etc.) may be, for example, a PN sequence, Chu sequence, or other sequence. In some examples, the LTE-U signature sequence may have a length of 93. An LTE-U signature may be selected from a set of predefined signatures having low cross-correlations with each other. In some examples, a signature is selected based on, and/or includes an indication of an LTE device identifier, a cell identifier, a supported LTE release version, a power class of the transmitter device, a transmission length, a PLMN identifier, a channel number, or any combination thereof.

The second set of symbols 425 may be scaled according to a gain ratio $G_s$ using gain element 405, to form a first scaled LTE-U signature sequence 460. The scaling factor may be predetermined or in some cases may be dynamically determined based on related factors such as channel conditions. In some cases the second set of symbols 425 may be scaled to have a significantly lower magnitude than the first set of symbols 430. In some cases, the scaling factor may be based on the magnitude of the STF of a WLAN preamble. The application of gain ratio $G_s$ may cause the first scaled LTE-U signature sequence 460 to be transmitted at a lower power than the first set of symbols 430, which in some examples may reduce an interference between the transmission of the first scaled LTE-U signature sequence 460 and the first set of symbols 430. Similarly, the fourth set of symbols 450 may be scaled according to a gain ratio $G_l$ using gain element 455, to form a second scaled LTE-U signature sequence 465.

The first scaled LTE-U signature sequence 460 and the first set of symbols 430 may be mapped to a first set of frequencies of an inverse Fast Fourier Transform (IFFT) 410, which may also include a frequency padding 435. The frequency padding 435 may be used at a zero frequency or center frequency subcarrier, as well as higher frequencies, to increase the resolution of the IFFT 410. In some cases, the first scaled LTE-U signature sequence 460 may utilize significantly smaller subcarrier spacing (e.g., one half, etc.) than the subcarrier spacing used for the first set of symbols 430. During the frequency mapping the first scaled LTE-U signature sequence 460 may be embedded with the first set of symbols 430. The IFFT 410 may then be performed on the mapped frequency symbols to generate a time domain version of the W-STF 470. In some cases, the IFFT 410 may be of size 256 (e.g., accepting information for 256 subcarriers, etc.). Similarly the second scaled LTE-U signature sequence 465 and the third set of symbols 445 may be mapped to a second set of frequencies of an IFFT 480 to generate a time domain version of the W-LTF 475. Similar to the IFFT 410, the IFFT 480 may also include a frequency padding (e.g., frequency padding 440). Generating both a W-STF 470 and a W-LTF 475 may allow for joint detection by way of both WLAN protocols and LTE protocols, and increase a device's ability to reliably identify a W-CUBS. Although flow chart 400 shows an embedding of LTE sequence(s) with both STF pilots and LTF pilots, in some examples a device may embed an LTE-U signature sequence with either STF pilots or LTF pilots, and form only one of the W-STF 470 or the W-LTF 475, respectively (e.g., forming an STF and a W-LTF, or forming a W-STF and an LTF, etc.).

Time domain processing 415 may be performed on W-STF 470 to provide a processed W-STF 490 and time domain processing 485 may be performed on the W-LTF to provide a processed W-LTF 495. In some cases, time domain processing 415 or time domain processing 485 may include adding a cyclic prefix and/or pulse shaping to the W-STF 470 or W-LTF 475 waveforms, respectively. Thus, the processed W-STF 490 may be a shaped W-STF, and the processed W-LTF 495 may be a shaped W-LTF. The processed W-STF 490 and the processed W-LTF 495 may subsequently be combined in a combination unit 420 to generate a W-CUBS preamble. In some examples the processed W-LTF 495 may be added to the end of the processed W-STF 490 by the combination unit 420. In some examples the combination unit 420 may combine the processed W-STF 490 and processed W-LTF 495 waveforms so that there is a smooth transition between the waveforms. The processed W-STF 490 and the processed W-LTF 495 may also be multiplexed with an L-SIG field and/or CTS-to-Self field to construct the W-CUBS. The W-CUBS may be downsampled to a sampling frequency associated with LTE-based transmissions prior to transmitting. In some examples the LTE sampling frequency may be different (e.g., lower, etc.) than the sampling frequency associated with Wi-Fi transmissions.

The W-CUBS may be transmitted over a frequency channel of a shared radio frequency spectrum band. The transmit power of the W-CUBS may be based on a predefined transmit power level for the WLAN preamble sequence. For example, the combined power level of the set of symbols associated with the Wi-Fi preamble (e.g., STF) and the set of symbols associated with an LTE-U signature may be comparable to the power level of a WLAN preamble. In some examples, a power level for transmitting a W-CUBS may be similar to a power level associated with transmitting a WLAN preamble in order to improve compatibility of the W-CUBS with devices employing WLAN protocols.

Figure 5:
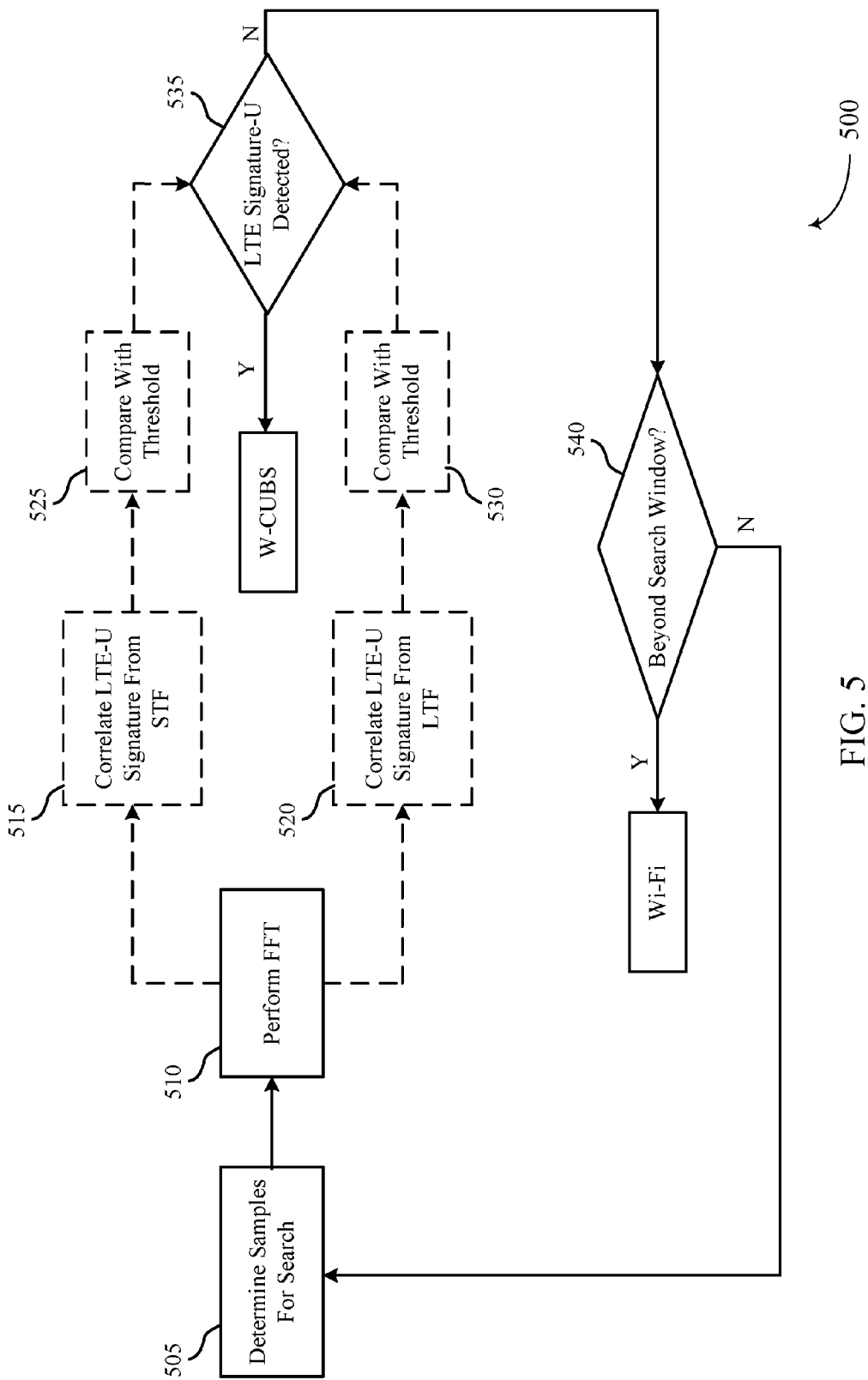
FIG. 5 illustrates an example flow chart for processing of a superposition coding based preamble, in accordance with aspects of the present disclosure.

FIG. 5 illustrates an example flow chart 500 for processing of a superposition coding based preamble, in accordance with aspects of the present disclosure. Flow chart 500 may be performed by a device such as a UE 115 or base station 105 as described above with reference to FIGS. 1 and 2. In some examples the device may perform the steps of flow chart 500 in order to process a received W-CUBS, and distinguish the W-CUBS from a preamble that may be otherwise transmitted according to WLAN protocols.

At block 505, the device may determine a search window in the device memory associated with received preambles. The device may then access its memory to retrieve stored samples associated with a received preamble signal. In some examples the device may process a subset of samples form the determined search window. For example, the device may identify up to 256 samples associated with the received preamble in the search window, which may begin with the first 256 samples of the received preamble. In some cases, the processed samples may correspond to a W-STF and/or a W-LTF. In some examples processing the received preamble includes performing a frequency domain correlation of the received preamble to one or more LTE-U signatures.

For example, the device may perform an FFT on the samples associated with the received preamble signal to transform the samples from the time domain to the frequency domain at block 510. In some examples the FFT may be of size 256 in order to provide signal magnitudes associated with 256 frequencies, which in some examples may correspond to 256 subcarriers used in a transmission. The output of the FFT process at block 510 may be provided to block 515 for correlation of an LTE-U signature in the W-STF or to block 520 for correlation of an LTE-U signature in the W-LTF.

For example, at block 515, transformed samples may be correlated with the LTE-U signature expected for a W-STF. Similarly, at block 520 transformed samples may be correlated with an LTE-U signature expected for a W-LTF.

At blocks 525 and 530, the device may compare the correlated LTE-U signatures with a threshold. Subsequently, at block 535 the device may determine if the LTE-U signature is detected based on the comparison. In some cases, if either or both of block 525 or block 530 yield a positive result then the device may determine at block 535 that an LTE-U signature is detected. If the device determines that the LTE-U signature is detected it may flag the received preamble as a W-CUBS signal. In some examples, the threshold may be determined based at least in part on a signal-to-noise ratio (SNR) or a signal-to-interference-plus-noise ratio (SINR) of the received preamble signal. Although shown including correlation circuitry for multiple preamble fields independently, a device may include only one set of circuitry that may perform correlations for one or more fields (e.g., blocks 515 and 525 or blocks 520 and 530), in some cases. If the device does not detect an LTE-U signature, the device may proceed to block 540.

At block 540, the device may determine whether the processed samples are beyond the allocated search window. If the set of samples are not beyond the search window the device may increment a pointer in memory and take the next set of samples (e.g., returning to block 505). Otherwise, if the device determines that the samples are beyond the search window the device may determine that the received preamble is a WLAN preamble transmitted by a device that is not employing LTE protocols.

Although the steps shown by flow chart 500 are described as being performed by a device employing LTE-based protocols, such as a UE 115 or a base station 105, in other examples the steps may be performed by a device employing WLAN protocols, such as an AP 150 or a STA 155 as described with reference to FIGS. 1 and 2. For example, an AP 150 or a STA 155 may perform the steps of flow chart 500 in order to identify whether a received preamble is sent from 405 an LTE-U device or a WLAN device. The AP 150 or a STA 155 may use a determination of a type of device (e.g., a determination of a protocol used by a device transmitting the preamble, etc.) to take various steps in response to the determination. For example, an AP 150 or STA 155 may perform steps of flow chart 500 to determine that a received preamble was transmitted by an LTE-U device, and use the determination to avoid further processing of communications from the LTE-U device.

FIG. 6 provides a graph 600 that illustrates a comparison of a W-CUBS with a Wi-Fi preamble in accordance with aspects of the present disclosure. Graph 600 may illustrate the similarities between a W-CUBS waveform and a Wi-Fi preamble. For example, graph 600 may illustrate a W-STF portion 605 and a W-LTF portion 610 for each of the W-CUBS and the Wi-Fi preamble, which may each last 8 μs. The similarities between the W-CUBS and the Wi-Fi preamble as shown in graph 600 may permit the W-CUBS to be received and decoded by devices employing Wi-Fi protocols as a valid Wi-Fi preamble. The devices employing Wi-Fi protocols may, therefore, perform back-off procedures based on receiving the W-CUBS.

FIG. 7 provides a graph 700 that illustrates a correlation of a W-CUBS signal with pilot symbols for a Wi-Fi preamble in accordance with aspects of the present disclosure. For example, graph 700 illustrates a correlation of a W-CUBS with pilot symbols of a Wi-Fi preamble for multiple SNR levels. The graph 700 may illustrate the correlation of the W-STF and W-LTF signals of a W-CUBS signal with L-STF and L-LTF signals of a Wi-Fi preamble. For example, as shown by graph 700, the correlating may yield nearly a 1:1 autocorrelation factor for both the W-STF and W-LTF. The periods of high correlation shown in graph 700 illustrate that a W-CUBS may provide a favorable correlation to the Wi-Fi preamble pilot symbols across a wide SNR range.

Figure 8:
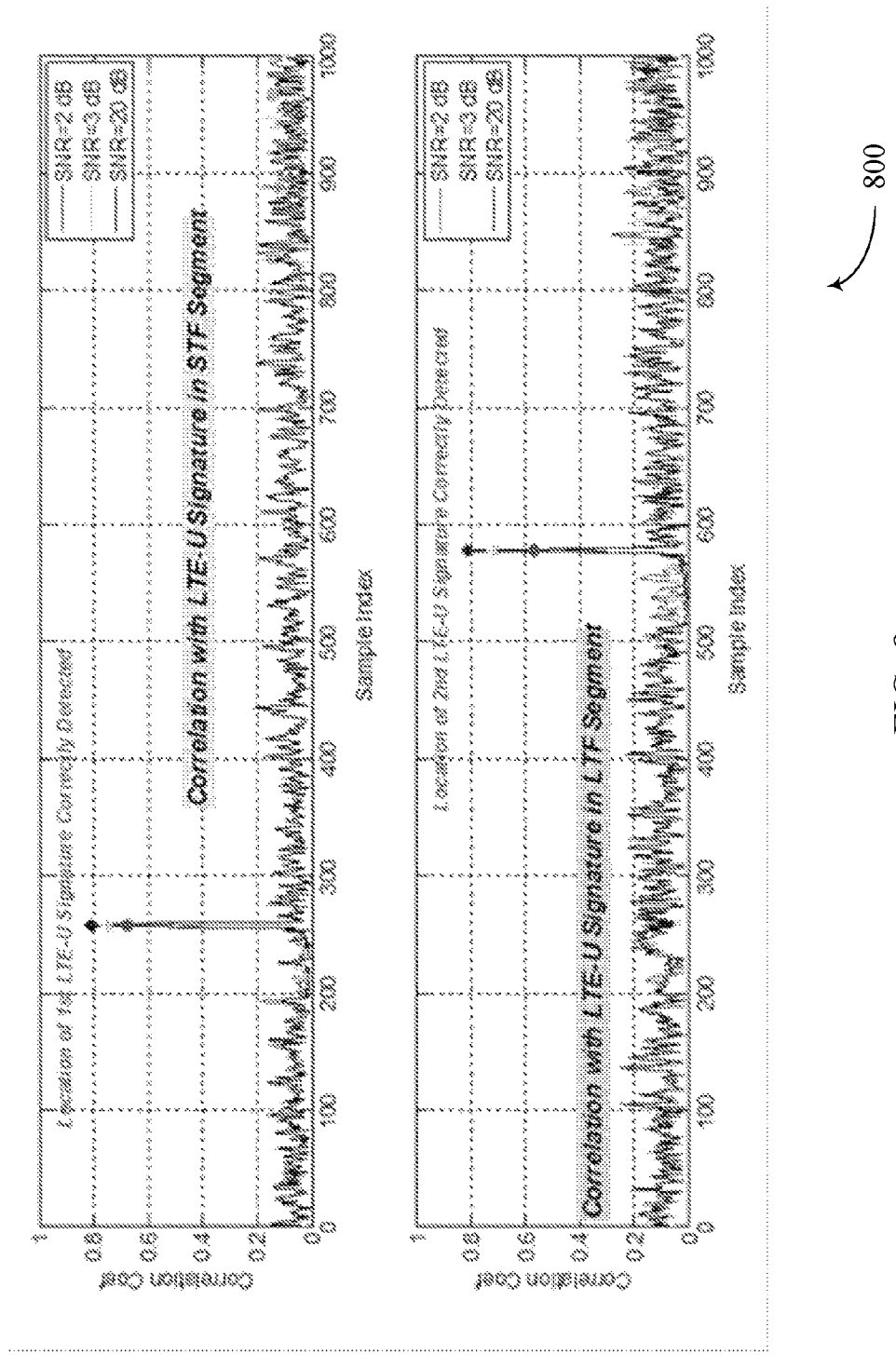
FIG. 8 provides a graph that illustrates a correlation of a W-CUBS with an LTE-U signature, in accordance with aspects of the present disclosure.

FIG. 8 provides a graph 800 that illustrates a correlation of a W-CUBS with an LTE-U signature, in accordance with aspects of the present disclosure. Graph 800 may illustrate the correlation of a W-CUBS with an LTE-U signature preamble for multiple SNR levels. The graph 800 may illustrate the correlation of the W-STF and W-LTF signals with the expected LTE-U signature. The correlating may yield distinct peaks that coincide with the correlating in graph 700. These peaks may be used to determine whether the received preamble is a W-CUBS.

Figure 9:
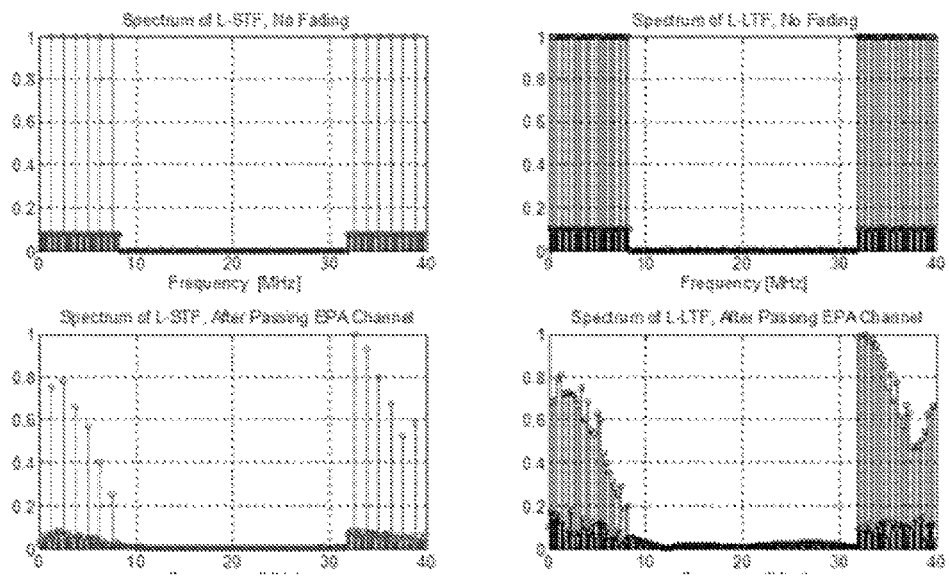
FIG. 9 provides example diagrams showing effects of channel fading for an enhanced preamble, in accordance with aspects of the present disclosure.

FIG. 9 provides example diagrams 900 showing effects of channel fading for an enhanced preamble, in accordance with aspects of the present disclosure. The diagrams 900 may illustrate effects of multipath fading propagation condition, such as an extended pedestrian A (EPA) model, on a transmitted W-CUBS. The top diagrams illustrate frequency domain representations of a W-STF field and a W-LTF field without fading, and the bottom diagrams illustrate frequency domain representations of the W-STF field and the W-LTF field after passing through an EPA channel model.

Figure 10:
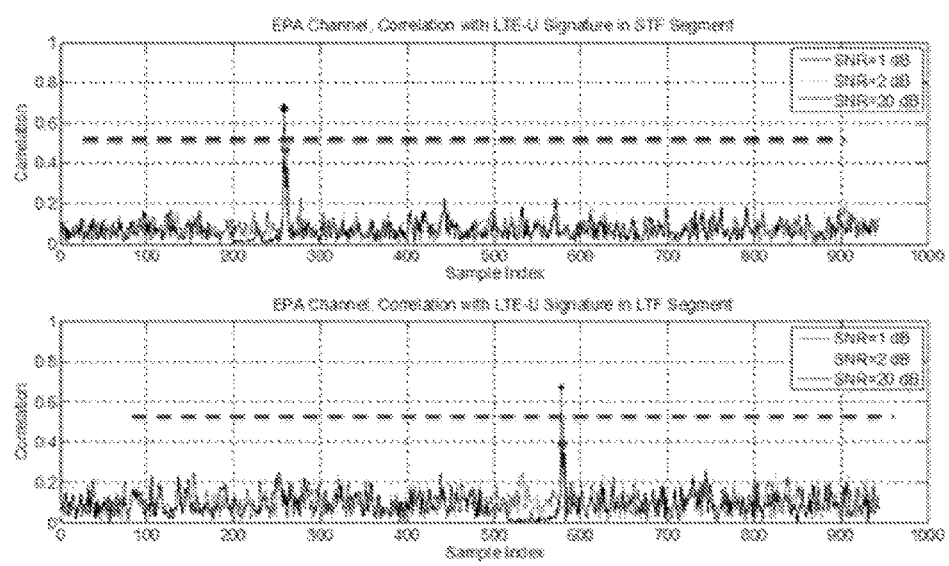
FIG. 10 provides a graph that illustrates a correlation of an LTE-U signature for a W-CUBS that has experienced channel fading, in accordance with aspects of the present disclosure.

FIG. 10 provides a graph 1000 that illustrates a correlation of an LTE-U signature for a W-CUBS that has experienced channel fading, in accordance with aspects of the present disclosure. Graph 1000 may illustrate the correlation of a W-CUBS with an LTE-U signature preamble for multiple SNR levels. Graph 1000 may, for example, be a time-domain representation of a W-CUBS experiencing a multipath fading propagation condition of a W-STF field and/or a W-LTF field, such as an EPA model, as illustrated in the frequency domain by diagrams 900. The graph 1000 may illustrate the correlation of the W-STF and W-LTF signals with the expected LTE-U signature. The correlating may yield distinct peaks that coincide with the correlation peaks, similar to those shown in graph 700 or graph 800. In some cases, a threshold may be determined and these peaks may be used to determine whether a received preamble is a W-CUBS, or a preamble transmitted by way of Wi-Fi protocols, for example. For instance, if the autocorrelation peaks are above the threshold, the device may flag a received signal as a W-CUBS. As shown in graph 1000, the detection of the LTE-U signature in the W-CUBS may be robust even under a multipath fading propagation condition.

Figure 11:
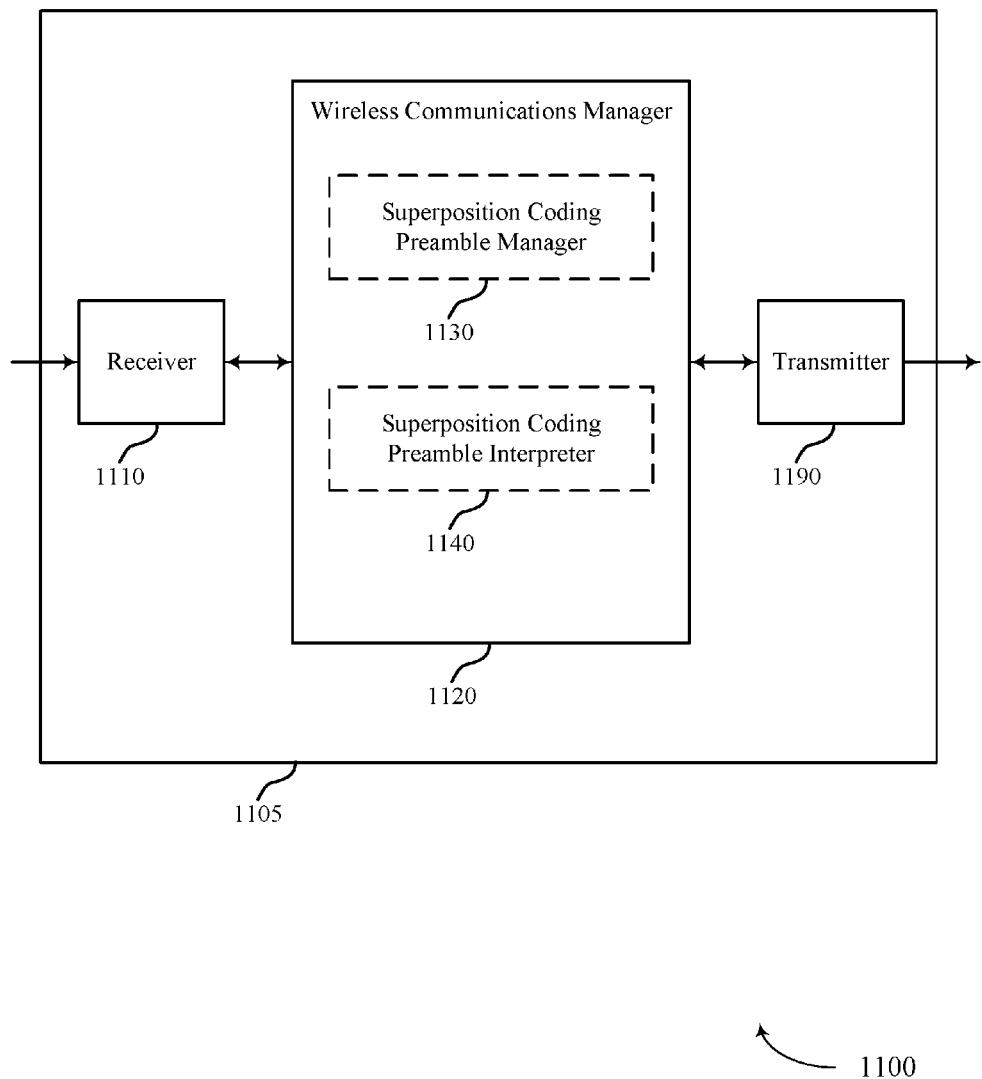
FIG. 11 shows a block diagram of a wireless device configured for superposition coding based preamble designs, in accordance with aspects of the present disclosure.

FIG. 11 shows a block diagram 1100 of a wireless communications device 1105 configured for superposition coding based preamble designs, in accordance with aspects of the present disclosure. Wireless communications device 1105 may be an example of aspects of a base station 105 or a UE 115 described with reference to FIGS. 1 and 2. Wireless communications device 1105 may include a receiver 1110, a wireless communications manager 1120, and a transmitter 1190. Wireless communications device 1105 may also include a processor. Each of these components may be in communication with each other.

The receiver 1110 may receive information such as packets, user data, or control information associated with various information channels (e.g., control channels, data channels, signals including superposition coding based preambles, etc.). Information may be passed on to the wireless communications manager 1120, and to other components of wireless communications device 1105. In some examples, the receiver 1110 may receive a preamble signal (e.g., a W-CUBS) transmitted over a shared frequency channel, the preamble signal having a predetermined preamble time duration associated with a first RAT, the preamble signal having a first set of symbols corresponding to a preamble sequence associated with the first RAT and a second set of symbols corresponding to a signature associated with the second RAT.

The transmitter 1190 may transmit signals received from other components of wireless communications device 1105. In some examples, the transmitter 1190 may be collocated with the receiver 1110 in a transceiver module. The transmitter 1190 may include a single antenna, or it may include a plurality of antennas. In some examples, the transmitter 1190 may transmit a preamble signal (e.g., a W-CUBS) over a frequency channel shared by a first RAT and a second RAT.

The wireless communications manager 1120 may be configured to manage aspects of communications, such as interpreting information carried via signals received by the receiver, and preparing information to be sent via signals transmitted by the transmitter 1190. In various examples, the wireless communications manager 1120 of the wireless communications device 1105 may include one or both of a superposition coding preamble manager 1130 or a superposition coding preamble interpreter 1140. The superposition coding preamble manager 1130 may be configured for generating a preamble signal comprising a superposition of symbols associated with a preamble sequence of a first RAT and a signature associated with a second RAT. The superposition coding preamble manager 1130 may provide the generated preamble signal to the transmitter 1190 for transmission over a shared radio frequency spectrum band. The superposition coding preamble interpreter 1140 may be configured for receiving a preamble, or information from a processed preamble, from the receiver 1110, wherein the preamble may include a superposition of symbols corresponding to a first RAT and a second RAT. The superposition coding preamble interpreter 1140 may subsequently determine whether a transmitter device associated with the received preamble signal is associated with a particular RAT based at least in part on identifying a signature in the received preamble signal. Thus, according to aspects of the present disclosure, a wireless communications manager 1120 may be configured for preparing a preamble having superposition coding for transmission, interpreting a received preamble comprising a superposition of symbols from a first RAT and a second RAT, or both preparing and interpreting.

Figure 12:
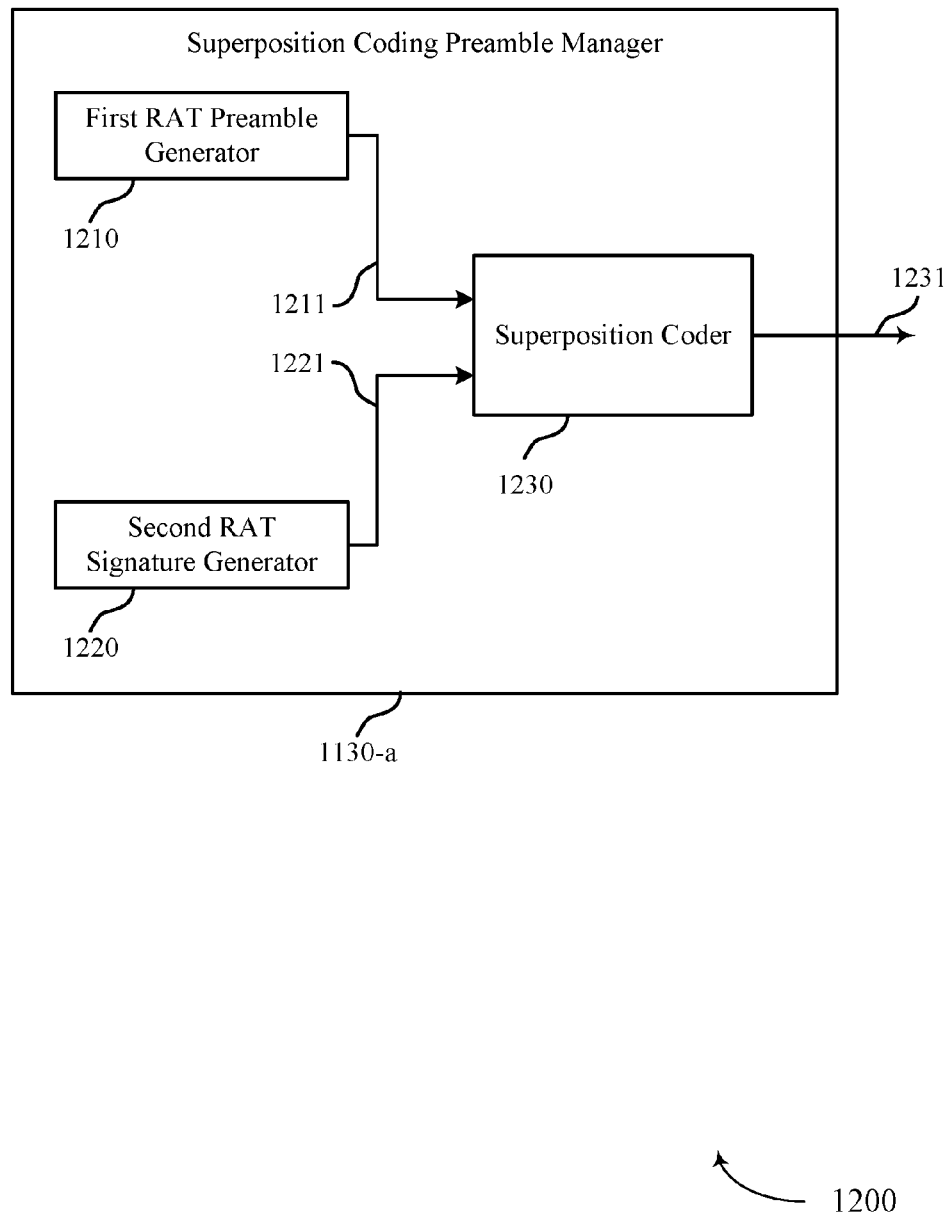
FIG. 12 shows a block diagram of a superposition coding preamble manager, in accordance with aspects of the present disclosure.

FIG. 12 shows a block diagram 1200 of a superposition coding preamble manager 1130-a, in accordance with aspects of the present disclosure. The superposition coding preamble manager 1130-a may be an example of aspects of a superposition coding preamble manager 1130 described with reference to FIG. 11, and may be a portion of a wireless communications manager 1120 of a wireless communications device 1105 as described with reference to FIG. 11 (e.g., a base station 105 or a UE 115 as described with reference to FIGS. 1 and 2, etc.). The superposition coding preamble manager 1130-a may include a first RAT preamble generator 1210, a second RAT signature generator 1220, and a superposition coder 1230. Each of these components may be in communication with each other.

The first RAT preamble generator 1210 may generate a first set of symbols 1211 for a preamble sequence associated with a first RAT, as described herein with reference to FIGS. 2-10. For example, the first RAT may be a WLAN RAT (e.g., Wi-Fi, etc.), and the first set of symbols 1211 may include one or both of a set of symbols for an STF or an LTF, according to WLAN protocols. The first RAT preamble generator 1210 may provide the first set of symbols 1211 to the superposition coder 1230.

The second RAT signature generator 1220 may generate a second set of symbols 1221 for a signature associated with a second RAT, as described herein with reference to FIGS. 2-10. For example, the second RAT may be an LTE RAT (e.g., LTE, LTA-A, LTE-U, etc.), and the signature may include a sequence of symbols that may be identifiable as a sequence of symbols transmitted by an LTE-U device. The second RAT signature generator 1220 may provide the second set of symbols 1221 to the superposition coder 1230.

The superposition coder 1230 may generate a preamble signal 1231 comprising a superposition of the first set of symbols 1211 and the second set of symbols 1221. Subsequent to the superposition, the first set of symbols 1221 as included in the preamble signal 1231 may be identifiable to both the first RAT and the second RAT and the second set of symbols 1221 may be identifiable as included in the preamble signal 1231 to the second RAT as described herein with reference to FIGS. 2-10. The superposition coder 1230 may provide the preamble signal 1231 to a transmitter, such as transmitter 1190 described with reference to FIG. 11, for transmission.

Figure 13:
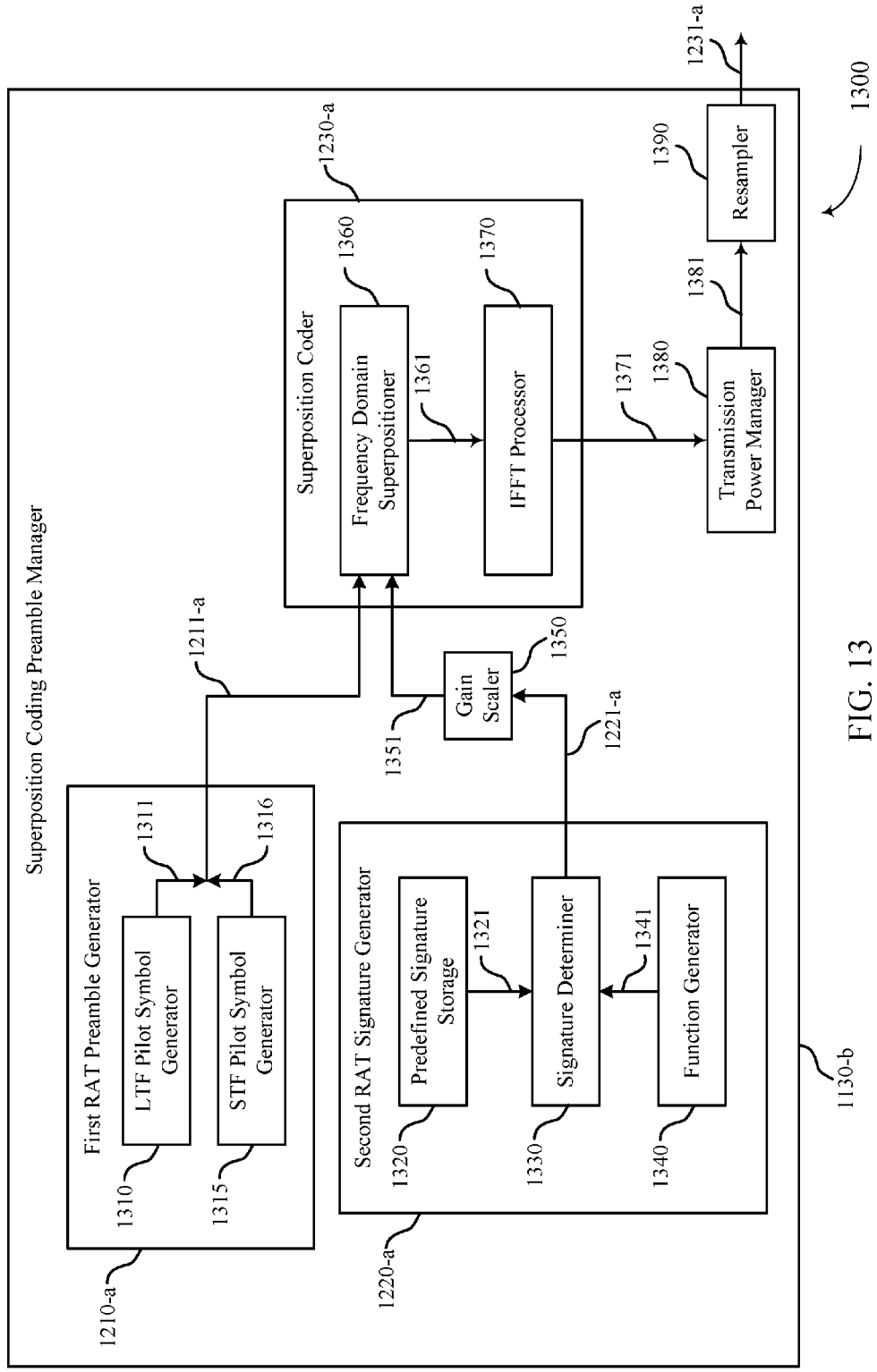
FIG. 13 shows a block diagram of a superposition coding preamble manager, in accordance with aspects of the present disclosure.

FIG. 13 shows a block diagram 1300 of a superposition coding preamble manager 1130-b, in accordance with aspects of the present disclosure. The superposition coding preamble manager 1130-a may be an example of aspects of a superposition coding preamble manager 1130 described with reference to FIGS. 11 and 12, and may be a portion of a wireless communications manager 1120 of a wireless communications device 1105 as described with reference to FIG. 11 (e.g., a base station 105 or a UE 115 as described with reference to FIGS. 1 and 2, etc.). The superposition coding preamble manager 1130-a may include a first RAT preamble generator 1210-a, a second RAT signature generator 1220-a, and a superposition coder 1230-a. Each of these components may be in communication with each other.

The first RAT preamble generator 1210-a may be an example of a first RAT preamble generator 1210 as described with reference to FIG. 12, and may generate a first set of symbols 1211-a for a preamble sequence associated with a first RAT (e.g., a WLAN protocol such as Wi-Fi, etc.), as described herein with reference to FIGS. 2-10. In various examples, the first RAT preamble generator 1210-a may include one or both of an LTF pilot symbol generator 1310 or an STF pilot symbol generator 1315.

The LTF pilot symbol generator 1310 may be configured to generate a set of LTF symbols 1311, such as a set of WLAN LTF symbols as described with reference to FIGS. 3 through 10. The STF pilot symbol generator 1315 may be configured to generate a set of STF symbols 1316, such as a set of WLAN STF symbols as described with reference to FIGS. 3 through 10.

The second RAT signature generator 1220-a may be an example of a second RAT signature generator 1220 as described with reference to FIG. 12, and may generate a second set of symbols 1221-a for a signature associated with a second RAT (e.g., an LTE-based protocol, etc.), as described herein with reference to FIGS. 2-10. In various examples, the second RAT signature generator 1220-*a* may include any one or more of a predefined signature storage 1320, a signature determiner 1330, or a function generator 1340.

The signature determiner 1330 may determine a signature identifiable by the second RAT from a set of predefined signatures. In some examples, the signature determiner 1330 may select a signature 1321 from the predefined signature storage 1320, which may be a portion of memory of the second RAT signature generator 1220-*a*, or otherwise available to the superposition coding preamble manager 1130-*a*. In some examples the predefined signature storage 1320 may include a set of predefined signatures having low cross-correlations with each other. In some examples the signature determiner 1330 may employ a signal function 1341 received from a function generator 1340. The function generator 1340 may, for example, generate a signature based at least in part on a pseudo-noise (PN) function, a Chu sequence, or other deterministic sequences.

In various examples, a determination and/or a selection of a signature may be based at least in part on a device identifier associated with a transmitter device for the second RAT, a cell identifier associated with a cell of the second RAT, a supported release version of the second RAT, a power class of the transmitter device, a transmission length, a public land mobile network ID, a channel number, or any combination thereof. The signature determiner 1330 may provide the determined signature as the second set of symbols 1221-*a*. Although the second set of symbols 1221-*a* are shown as a single communication, in some examples the second RAT signature generator may provide more than one set of symbols corresponding to one or more second RAT signatures to the superposition coder 1230-*a* via separate communications. For example, the second RAT signature generator 1220-*a* may provide a set of symbols for use in a W-LTF, and another set of symbols for use in a W-STF, as described with reference to FIGS. 3 through 10.

In some examples the second set of symbols 1221-*a* may be received by a gain scaler 1350, which may apply a gain ratio to the second set of symbols 1221-*a*. In some example the gain ratio may correspond to a reduction in transmission power associated with the second set of symbols in order to reduce an interference between a transmission of the first set of symbols and the second set of symbols. The gain scaler 1350 may subsequently provide a scaled second set of symbols 1351 to the superposition coder 1230-*a*.

The superposition coder 1230-*a* may be an example of a superposition coder 1230 as described with reference to FIG. 12, and may generate a preamble signal comprising a superposition of the first set of symbols and the second set of symbols, as described herein with reference to FIGS. 2-10. In various examples, the first RAT preamble generator 1210-*a* may include one or both of a frequency domain superpositioner 1360 or an IFFT processor 1370.

The frequency domain superpositioner 1360 may be configured to perform a frequency domain superposition of the first set of symbols 1211-*a* and the second set of symbols 1221-*a* (or scaled second set of symbols 1351) to obtain a frequency domain preamble signal 1361. In some examples, the frequency domain superpositioner 1360 may be configured to map the first set of symbols 1211-*a* to a first set of subcarriers associated with pilot symbols for the preamble sequence within the shared frequency channel, and map the second set of symbols 1211-*a* (or scaled second set of symbols 1351) to a second set of subcarriers within the shared frequency channel. In some examples the second set of subcarriers may include one or more subcarrier frequencies in between respective subcarriers of the first set of subcarriers, as described herein with reference to FIGS. 2-10. In some examples, the first set of subcarriers may include a subset of subcarriers having a first subcarrier spacing associated with transmissions via the first RAT, and the second set of subcarriers may include one or more subcarriers having a second subcarrier spacing smaller than the first subcarrier spacing.

The IFFT processor 1370 may be configured to perform a frequency domain to time domain transform on the frequency domain preamble signal 1361, as described herein with reference to FIGS. 2-10, to provide a time domain preamble signal 1371. In some examples the time domain preamble signal 1371 may continue from the IFFT processor 1370 to a transmission power manager 1380. The transmission power manager 1380 may associate a transmission power with the time domain preamble signal 1371 to provide a power-associated preamble signal 1381. The power-associated preamble signal 1381 may include a transmission power selected based at least in part on a predefined transmit power level for the preamble sequence associated with the first RAT.

In some examples the power-associated preamble signal 1381 may be provided to a resampler 1390, which may provide a preamble signal 1231-*a* at a resampled frequency. For example, the resampler 1390 may downsample the preamble signal 1381 to a sampling frequency associated with transmissions of the second RAT as described herein with reference to FIGS. 2-10. In some examples, the sampling frequency may be different than the sampling frequency associated with transmissions of the first RAT. The resampler 1390 may also sample the received preamble signal 1381 at a first sampling rate associated with transmissions of the second RAT. The superposition coding preamble manager 1130-*b* may provide the preamble signal 1231-*a* to a transmitter, such as transmitter 1190 described with reference to FIG. 11, for transmission.

Figure 14:
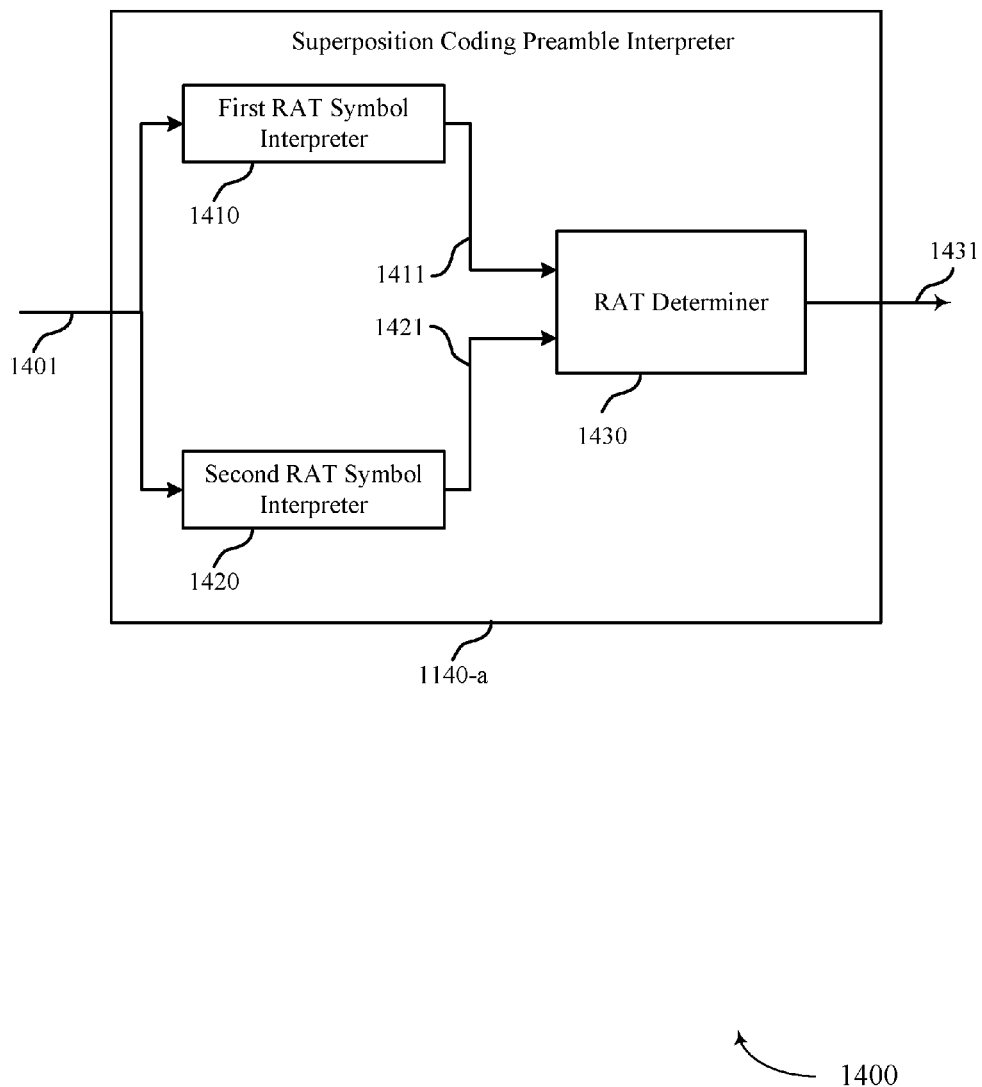
FIG. 14 shows a block diagram of a superposition coding preamble interpreter, in accordance with aspects of the present disclosure.

FIG. 14 shows a block diagram 1400 of a superposition coding preamble interpreter 1140-*a*, in accordance with aspects of the present disclosure. The superposition coding preamble interpreter 1140-*a* may be an example of aspects of a superposition coding preamble interpreter 1140 described with reference to FIG. 11, and may be a portion of a wireless communications manager 1120 of a wireless communications device 1105 (e.g., a base station 105 or a UE 115 as described with reference to FIGS. 1 and 2, etc.). The superposition coding preamble interpreter 1140-*a* may include a first RAT symbol interpreter 1410, a second RAT symbol interpreter 1420, and a RAT determiner 1430. Each of these components may be in communication with each other.

The first RAT symbol interpreter 1410 may receive a preamble signal 1401, or portions of the preamble signal 1401, from a receiver, such as receiver 1110 as described with reference to FIG. 11, which may be forwarded from another portion of a wireless communications manager 1120. In some examples the preamble signal 1401 may have been sampled at a sampling frequency corresponding to a sampling frequency of the first RAT, or a sample frequency associated with the second RAT. For example, the preamble signal 1401 may have been sampled at a receiver at a sampling frequency associated with a WLAN RAT (e.g., 40 MHz) or at a sampling frequency associated with an LTE RAT (e.g., 30.72 MHz). In some examples the preamble signal 1401 may be provided at a sampling frequency suitable for both the first RAT and the second RAT, such as a sampling rate at or near an integer multiple of both the first sampling frequency and the second sampling frequency (e.g., 120 MHz), which may further include a filtering of the preamble signal 1401. The first RAT symbol interpreter 1410 may, for example, identify a first set of symbols 1411 corresponding to a preamble sequence associated with a first RAT. The first RAT symbol interpreter 1410 may receive a preamble signal 1401 from a receiver, such as receiver 1110 as described with reference to FIG. 11. The first RAT symbol interpreter 1410 may, for example, identify a first set of symbols 1411 corresponding to a preamble sequence associated with a first RAT.

The second RAT symbol interpreter 1420 may also receive the preamble signal 1401, or portions of a preamble signal 1401, from a receiver, which may also be forwarded from another portion of a wireless communications manager. The second RAT symbol interpreter 1420 may, for example, identify a second set of symbols 1421 corresponding to a signature associated with a second RAT.

The RAT determiner 1430 may determine that a transmitter device is associated with the received preamble signal is associated with the second RAT based at least in part on identifying the signature in the received preamble signal. For example, the RAT determiner 1430 may perform a correlation between the second set of symbols to a known signature associated with the second RAT. In some examples the RAT determiner 1430 may determine that a transmitter device is not associated with the second RAT (e.g., is associated with the first RAT) by identifying a lack of a known signature in the received preamble signal. The RAT determiner 1430 may provide the determination 1431 to other portions of a wireless communications manager, such as wireless communications manager 1120 described with reference to FIG. 11. The determination 1431 may be used by portions of a wireless communications manager, such as managing aspects of communications over a shared radio frequency spectrum band (e.g., performing contention procedures, back-off procedures, etc.)

Figure 15:
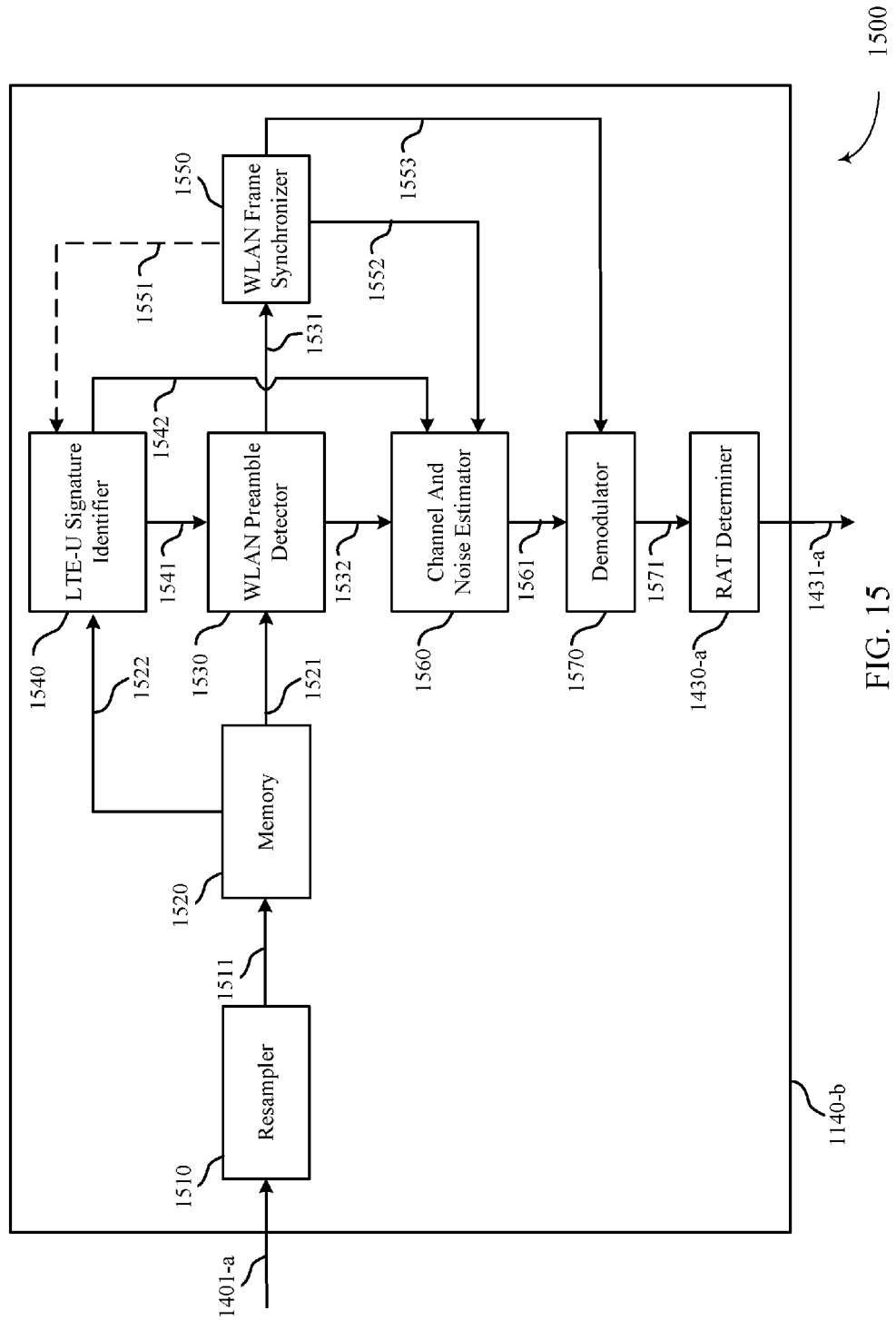
FIG. 15 shows a block diagram of a superposition coding preamble interpreter, in accordance with aspects of the present disclosure.

FIG. 15 shows a block diagram 1500 of a superposition coding preamble interpreter 1140-b, in accordance with aspects of the present disclosure. The superposition coding preamble interpreter 1140-b may be an example of aspects of a superposition coding preamble interpreters 1140 described with reference to FIG. 11 or 12, and may be a portion of a wireless communications manager 1120 of a wireless communications device 1105 (e.g., a base station 105 or a UE 115 as described with reference to FIGS. 1 and 2, etc.). The superposition coding preamble interpreter 1140-b may include a resampler 1510, memory 1520, a WLAN preamble detector 1530, an LTE-U signature identifier 1540, a WLAN frame synchronizer 1550, a channel and noise estimator 1560, a demodulator 1570, and a RAT determiner 1430-a. The components of the superposition coding preamble interpreter 1140-b may be used to implement aspects of flow chart 500 and may be used to determine whether a received preamble comprises an LTE-U signature.

The resampler 1510 may receive a preamble signal 1401-a at a first sampling frequency associated with an LTE RAT (e.g., 30.72 MHz), and provide the sampled preamble signal 1511 to the memory 1520 at a second sampling frequency associated with a WLAN RAT (e.g., 40 MHz). The memory 1520 may include random access memory (RAM), non-volatile memory, and the like. The memory 1520 may store computer-readable, computer-executable code and may additionally be used to store the sampled preamble signal 1511. Samples 1521 may be retrieved from the memory 1520 by the WLAN preamble detector 1530 to detect whether the received preamble signal 1401-a comprises a WLAN preamble. In some examples the WLAN preamble detector 1530 may provide preamble information 1531 to the WLAN frame synchronizer 1550, which may provide synchronization information 1551 to the LTE-U signature identifier 1540 to be used to synchronize the LTE-U signature with the WLAN preamble. Additionally or alternatively, the WLAN frame synchronizer 1550 may send synchronization information 1552 or 1553 to channel and noise estimator 1560 and/or the demodulator 1570, respectively. The synchronization information 1552 may be used by a channel and noise estimator 1560 to enhance channel and noise estimates of a WLAN preamble or LTE-U signature (e.g., associated control information and/or data). The synchronization information 1553 may be used by the demodulator 1570 to enhance the demodulation of a WLAN preamble or LTE-U signature, or other associated signaling (e.g., associated control information and/or data).

Samples 1522 may be retrieved by the LTE-U signature identifier 1540 to identify whether the received preamble signal 1401-a comprises an LTE-U signature. The operation of LTE-U signature identifier 1540 may utilize the synchronization information 1551 in the identification, and may, for example, provide LTE-U signature information 1541 by way of the WLAN preamble detector 1530. Additionally or alternatively, the LTE-U signature identifier 1540 may provide LTE-U signature information 1542 to the channel and noise estimator 1560.

The channel and noise estimator 1560 may receive preamble information 1532 from the WLAN preamble detector, which may be a combination of an LTE-U signature and a WLAN preamble, and/or LTE-U signature information 1542 from the LTE-U signature identifier. The channel and noise estimator 1560 may improve aspects of the preamble information 1532 and/or LTE-U signature information 1542 (e.g., reduce noise, improve channel correlation, etc.), and provide improved preamble information 1561 to the demodulator 1570. The demodulator 1570 may be used, for example, to demodulate the LTE-U signature and/or the WLAN preamble. A demodulated LTE-U signature may include information such as a device identifier associated with the transmitter device for the second RAT, a cell identifier associated with a cell of the second RAT, a supported version of the second RAT, a power class of the transmitter device, a transmission length, or combinations thereof. In some examples the demodulator 1570 can provide LTE-U signature information 1571 to the RAT determiner 1430-a, which may provide a determination 1431-a of whether or not the received preamble signal 1401-a was received from a device associated with an LTE RAT.

The components of the wireless communications device 1105, the superposition coding preamble managers 1130, and the superposition coding preamble interpreters 1140 described with reference to FIGS. 11 through 15 may, individually or collectively, be implemented with at least one application-specific integrated circuit (ASIC) adapted to perform some or all of the applicable functions in hardware. Alternatively, the functions may be performed by one or more other processing units (or cores), on at least one integrated circuit (IC). In other examples, other types of integrated circuits may be used (e.g., Structured/Platform ASICs, a field-programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

In various examples of a superposition coding preamble manager 1130 or a superposition coding preamble interpreter 1140 as described with reference to FIGS. 11 through 15, one or more of the blocks shown may be implemented as portions (e.g., functional blocks, etc.) of software/firmware code stored in memory at a device (e.g., at a wireless communications device 1105 described with reference to FIG. 11). In such examples, any of the respective communications may be implemented as a parameter handoff between the respective portions of code. Additionally or alternatively, one or more of the blocks shown, or any portion thereof, may be implemented by separate hardware units, including portions of code executed at a standalone processors. In such examples, any of the respective communications may be implemented as a wired or wireless signal transmission between the respective separate hardware units.

Figure 16:
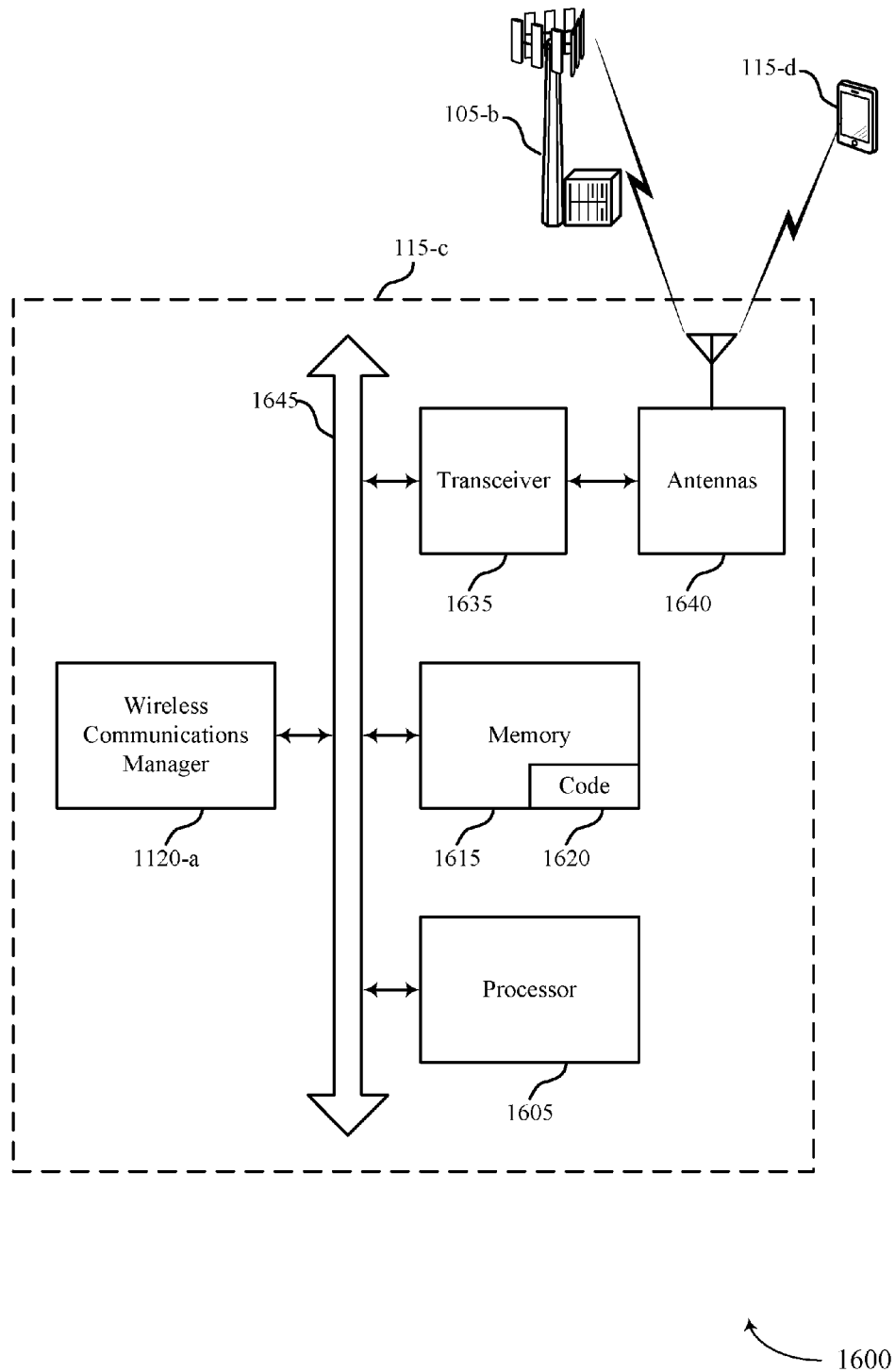
FIG. 16 shows a diagram of a system including a UE configured for superposition coding based preamble designs, in accordance with aspects of the present disclosure.

FIG. 16 shows a diagram of a system 1600 including a UE 115-*c* configured for superposition coding based preamble designs, in accordance with aspects of the present disclosure. The UE 115-*c* may be an example of a UE 115 described with reference to FIGS. 1 and 2, or a wireless communications device 1105 described with reference to FIG. 11. The UE 115-*c* may include a wireless communications manager 1120-*a*, which may be an example of a wireless communications manager 1120 described with reference to FIG. 11. The UE 115-*c* may also include components for bi-directional voice and data communications including components for transmitting communications and components for receiving communications. For example, the UE 115-*c* may communicate bi-directionally with a base station 105-*b* and/or a UE 115-*d*.

UE 115-*c* may also include a processor 1605, and memory 1615, a transceiver 1635, and one or more antenna(s) 1640, each of which may communicate, directly or indirectly, with one another (e.g., via buses 1645). The transceiver 1635 may communicate bi-directionally, via the antenna(s) 1640 or wired or wireless links, with one or more networks, as described above. For example, the transceiver 1635 may communicate bi-directionally with the base station 105-*b* and/or the UE 115-*d*. The transceiver 1635 may include a modem to modulate the packets and provide the modulated packets to the antenna(s) 1640 for transmission, and to demodulate packets received from the antenna(s) 1640. While UE 115-*c* may include a single antenna 1640, UE 115-*c* may also have multiple antennas 1640 capable of concurrently transmitting or receiving multiple wireless transmissions.

The memory 1615 may include random access memory (RAM) and read only memory (ROM). The memory 1615 may store computer-readable, computer-executable software/firmware code 1620 including instructions that, when executed by the processor, cause the UE 115-*c* to perform various functions described herein (e.g., superposition coding based preamble designs for a coexistence of multiple RATs, etc.). Alternatively, the software/firmware code 1620 may not be directly executable by the processor 1605 but cause a computer (e.g., when compiled and executed) to perform functions described herein. The processor 1605 may include an intelligent hardware device, (e.g., a central processing unit (CPU), a microcontroller, an ASIC, etc.).

The wireless communications manager 1120-*a* may be an example of a wireless communications manager 1120 described with reference to FIG. 11, and may manage various aspects of implementing superposition coding based preamble designs for coexisting RATs as described herein. The wireless communications manager 1120-*a* may be in communication with other components of the UE 115-*c*, directly or indirectly, over the one or more buses 1645. The wireless communications manager 1120-*a*, or portions of it, may include a processor, or some or all of the functions of the wireless communications manager 1120-*a* may be performed by the processor 1605 or in connection with the processor 1605.

Figure 17:
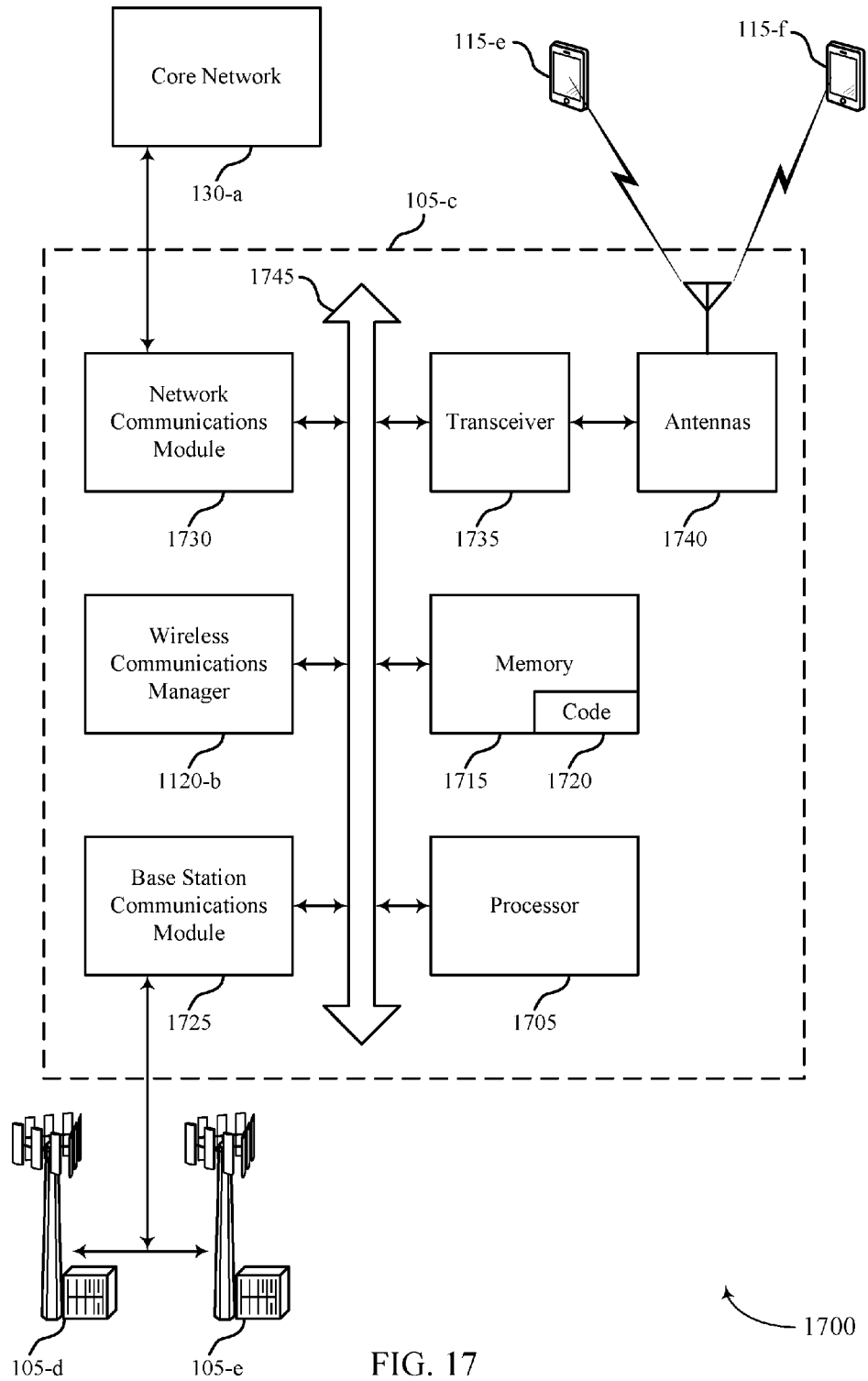
FIG. 17 shows a diagram of a system including a base station configured for superposition coding based preamble designs, in accordance with aspects of the present disclosure.

FIG. 17 shows a diagram of a system 1700 including a base station 105-*c* configured for superposition coding based preamble designs, in accordance with aspects of the present disclosure. The base station 105-*c* may be an example of a base station 105 described with reference to FIGS. 1 and 2, or a wireless communications device 1105 described with reference to FIG. 11. The base station 105-*c* may include a wireless communications manager 1120-*b*, which may be an example of a wireless communications manager 1120 as described with reference to FIG. 11. The base station 105-*c* may also include components for bi-directional voice and data communications including components for transmitting communications and components for receiving communications. For example, the base station 105-*c* may communicate bi-directionally with a base station 105-*d*, a base station 105-*e*, a UE 115-*e*, and/or a UE 115-*f*.

In some cases, base station 105-*c* may have one or more wired backhaul links. Base station 105-*c* may have a wired backhaul link (e.g., S1 interface, etc.) to the core network 130-*a*. Base station 105-*c* may also communicate with other base stations 105, such as base station 105-*d* and base station 105-*e* via inter-base station backhaul links (e.g., an X2 interface). Each of the base stations 105 may communicate with UEs 115 using the same or different wireless communications technologies. In some cases, base station 105-*c* may communicate with other base stations such as 105-*d* or 105-*e* utilizing base station communications module 1725. In some examples, base station communications module 1725 may provide an X2 interface within an LTE/LTE-A wireless communication network technology to provide communication between some of the base stations 105. In some examples, base station 105-*c* may communicate with other base stations through core network 130-*a*. In some cases, base station 105-*c* may communicate with the core network 130 through network communications module 1730.

The base station 105-*c* may include a processor 1705, memory 1715, transceiver 1735, and antenna(s) 1740, which each may be in communication, directly or indirectly, with one another (e.g., over bus 1745). The transceivers 1735 may be configured to communicate bi-directionally, via the antenna(s) 1740, with the UEs 115, which may be multi-mode devices. The transceiver 1735 (or other components of the base station 105-*c*) may also be configured to communicate bi-directionally, via the antennas 1740, with one or more other base stations (not shown). The transceiver 1735 may include a modem configured to modulate the packets and provide the modulated packets to the antennas 1740 for transmission, and to demodulate packets received from the antennas 1740. The base station 105-*c* may include multiple transceivers 1735, each with one or more associated antennas 1740. The transceiver 1735 and antenna(s) 1740 may be an example of aspects of both a receiver 1110 and transmitter 1190 described with reference to FIG. 11 (e.g., a combined receiver 1110 and transmitter 1190, etc.).

The memory 1715 may include RAM and ROM. The memory 1715 may also store computer-readable, computer-executable software/firmware code 1720 containing instructions that are configured to, when executed by the processor 1705, cause the base station 105-*c* to perform various functions described herein (e.g., selecting coverage enhancement techniques, call processing, database management, message routing, etc.). Alternatively, the software/firmware code 1720 may not be directly executable by the processor 1705 but be configured to cause the computer, e.g., when compiled and executed, to perform functions described herein. The processor 1705 may include an intelligent hardware device, e.g., a CPU, a microcontroller, an ASIC, etc. The processor 1705 may include various special purpose processors such as encoders, queue processing modules, base band processors, radio head controllers, digital signal processors (DSPs), and the like.

The base station communications module 1725 may manage communications with other base stations 105. The base station communications module 1725 may include a controller or scheduler for controlling communications with UEs 115 in cooperation with other base stations 105. For example, the base station communications module 1725 may coordinate scheduling for transmissions to UEs 115 for various interference mitigation techniques such as beamforming or joint transmission.

The wireless communications manager 1120-*b* may be an example of a wireless communications manager 1120 described with reference to FIG. 11, and may manage various aspects of implementing superposition coding based preamble designs for coexisting RATs as described herein. The wireless communications manager 1120-*b* may be in communication with other components of the base station 105-*c*, directly or indirectly, over the one or more buses 1745. The wireless communications manager 1120-*b*, or portions of it, may include a processor, or some or all of the functions of the wireless communications manager 1120-*b* may be performed by the processor 1705 or in connection with the processor 1705.

Figure 18:
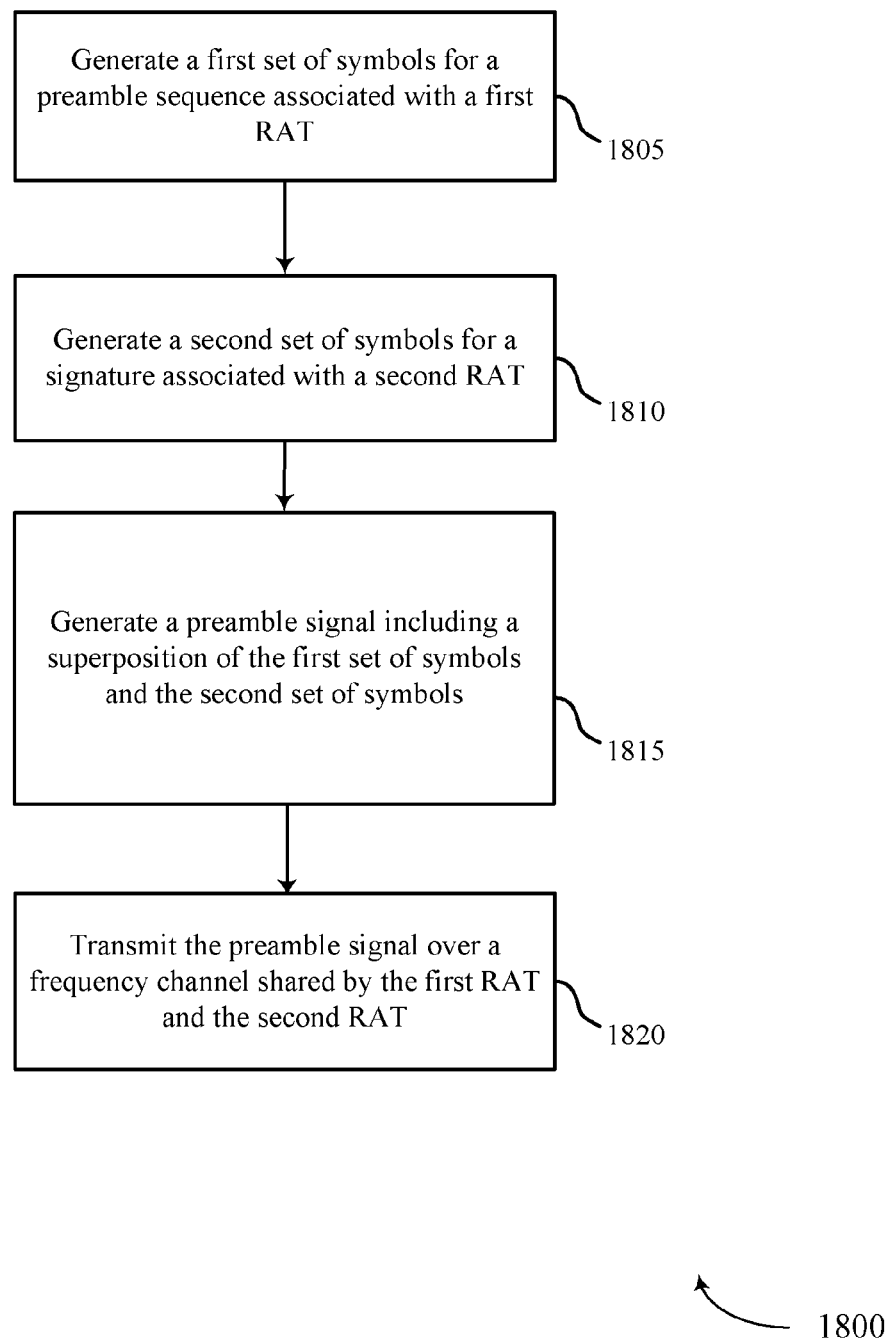
FIG. 18 shows a flowchart illustrating a method for superposition coding of a preamble, in accordance with aspects of the present disclosure.

FIG. 18 shows a flowchart illustrating a method 1800 for superposition coding of a preamble, in accordance with aspects of the present disclosure. The operations of method 1800 may be implemented by a device, or its components, such as a wireless communications device 1105 described with reference to FIG. 11, a UE 115 as described with reference to FIG. 1, 2, or 16, or a base station 105 as described with reference to FIG. 1, 2, or 17. For example, the operations of method 1800 may be performed by a wireless communications manager 1120 as described with reference to FIG. 11, 16, or 17, including operations by a superposition coding preamble manager 1130 described with reference to FIG. 11, 12 or 13. In some examples, a device may execute a set of codes to control the functional elements of the device to perform the functions described below. Additionally or alternatively, the device may perform aspects the functions described below using special-purpose hardware.

At block 1805, the device may generate a first set of symbols for a preamble sequence associated with a first RAT as described herein with reference to FIGS. 2-10. In some examples, the operations of block 1805 may be performed by the first RAT preamble generator 1210 as described herein with reference to FIG. 12 or 13.

At block 1810, the device may generate a second set of symbols for a signature associated with a second RAT as described herein with reference to FIGS. 2-10. In some examples, the operations of block 1810 may be performed by the second RAT signature generator 1220 as described herein with reference to FIG. 12 or 13.

At block 1815, the device may generate a preamble signal comprising a superposition of the first set of symbols and the second set of symbols. In some examples, the first set of symbols may be identifiable by both the first RAT and the second RAT and the second set of symbols may be identifiable to the second RAT, as described herein with reference to FIGS. 2-10. In certain examples, the operations of block 1815 may be performed by the superposition coder 1230 as described herein with reference to FIG. 12 or 13.

At block 1820, the device may transmit the preamble signal over a frequency channel shared by the first RAT and the second RAT as described herein with reference to FIGS. 2-10. In certain examples, the operations of block 1820 may be performed by, or in cooperation with a transmitter 1190 as described with reference to FIG. 11, a transceiver 1635 and antenna(s) 1640 described with reference to FIG. 16, or a transceiver 1735 and antenna(s) 1740 described with reference to FIG. 17. In some examples the transmitting may be in cooperation with a wireless communications manager 1120 as described with reference to FIG. 11, 16, or 17, including a superposition coding preamble manager 1130 as described with reference to FIG. 11, 14, or 15

Figure 19:
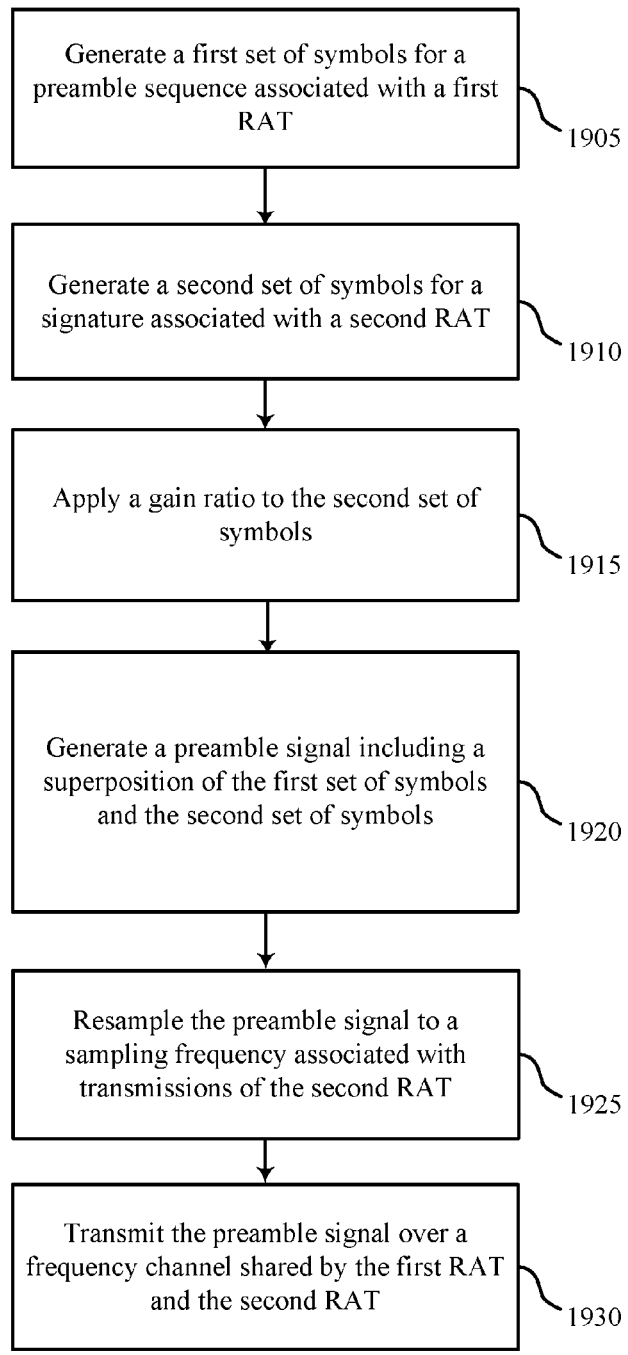
FIG. 19 shows a flowchart illustrating a method for superposition coding of a preamble, in accordance with aspects of the present disclosure.

FIG. 19 shows a flowchart illustrating a method 1900 for superposition coding of a preamble, in accordance with aspects of the present disclosure. The operations of method 1900 may be implemented by a device, or its components, such as a wireless communications device 1105 described with reference to FIG. 11, a UE 115 as described with reference to FIG. 1, 2, or 16, or a base station 105 as described with reference to FIG. 1, 2, or 17. For example, the operations of method 1900 may be performed by a wireless communications manager 1120 as described with reference to FIG. 11, 16, or 17, including operations by a superposition coding preamble manager 1130 described with reference to FIG. 11, 12 or 13. In some examples, a device may execute a set of codes to control the functional elements of the device to perform the functions described below. Additionally or alternatively, the device may perform aspects the functions described below using special-purpose hardware At block 1905, the device may generate a first set of symbols for a preamble sequence associated with a first RAT as described herein with reference to FIGS. 2-10. In some examples, the operations of block 1905 may be performed by the first RAT preamble generator 1210 as described herein with reference to FIG. 12 or 13.

At block 1910, the device may generate a second set of symbols for a signature associated with a second RAT as described herein with reference to FIGS. 2-10. In some examples, the operations of block 1910 may be performed by the second RAT signature generator 1220 as described herein with reference to FIG. 12 or 13.

At block 1915, the device may apply a gain ratio to the second set of symbols as described herein with reference to FIGS. 2-10. In certain examples, the operations of block 1915 may be performed by the gain scaler 1350 as described herein with reference to FIG. 13.

At block 1920, the device may generate a preamble signal comprising a superposition of the first set of symbols and the second set of symbols. In some examples, the first set of symbols may be identifiable by both the first RAT and the second RAT and the second set of symbols may be identifiable to the second RAT, as described herein with reference to FIGS. 2-10. In certain examples, the operations of block 1920 may be performed by the superposition coder 1230 as described herein with reference to FIG. 12 or 13.

At block 1925, the device may resample the preamble signal to a sampling frequency associated with transmissions of the second RAT, as described herein with reference to FIGS. 2-10. In certain examples, the operations of block 1925 may be performed by the resampler 1390 as described herein with reference to FIG. 13.

At block 1930, the device may transmit the preamble signal over a frequency channel shared by the first RAT and the second RAT as described herein with reference to FIGS. 2-10. In certain examples, the operations of block 1930 may be performed by, or in cooperation with a transmitter 1190 as described with reference to FIG. 11, a transceiver 1635 and antenna(s) 1640 as described with reference to FIG. 16, or a transceiver 1735 and antenna(s) 1740 as described with reference to FIG. 17. In some examples the transmitting may be in cooperation with a wireless communications manager 1120 as described with reference to FIG. 11, 16, or 17, including a superposition coding preamble manager 1130 as described with reference to FIG. 11, 14, or 15.

Figure 20:
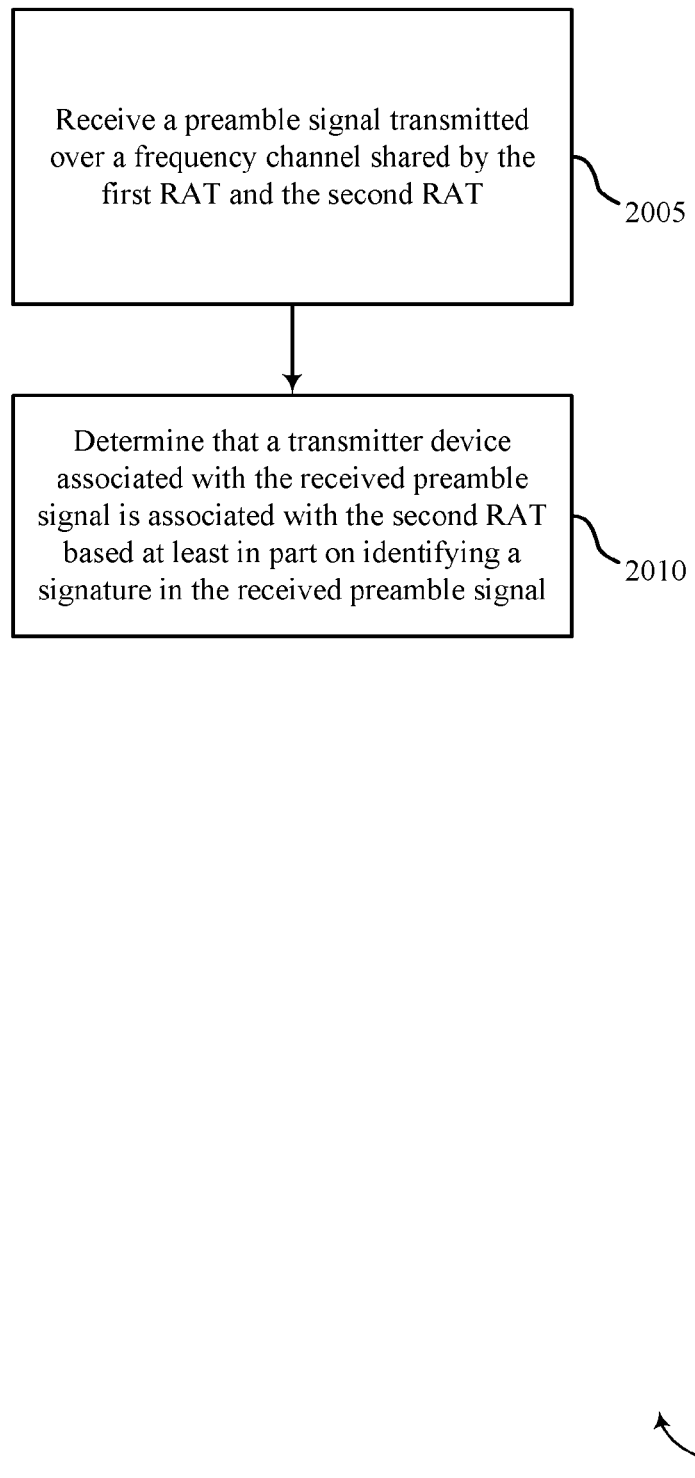
FIG. 20 shows a flowchart illustrating a method for processing a superposition coding based preamble, in accordance with aspects of the present disclosure.

FIG. 20 shows a flowchart illustrating a method 2000 for processing a superposition coding based preamble in accordance with aspects of the present disclosure. The operations of method 2000 may be implemented by a device, or its components, such as a wireless communications device 1105 described with reference to FIG. 11, a UE 115 as described with reference to FIG. 1, 2, or 16, or a base station 105 as described with reference to FIG. 1, 2, or 17. For example, the operations of method 2000 may be performed by a wireless communications manager 1120 as described with reference to FIG. 11, 16, or 17, including operations by a superposition coding preamble interpreter 1140 described with reference to FIG. 11, 14, or 15. In some examples, a device may execute a set of codes to control the functional elements of the device to perform the functions described below. Additionally or alternatively, the device may perform aspects the functions described below using special-purpose hardware.

At block 2005, the device may receive a preamble signal transmitted over a frequency channel shared by a first RAT and a second RAT. The preamble signal may a predetermined preamble time duration associated with the first RAT, and may identifiable by the first RAT and the second RAT as described herein with reference to FIGS. 2-10. For example, the preamble signal may have a first set of symbols corresponding to a preamble sequence associated with the first RAT and a second set of symbols corresponding to a signature associated with the second RAT. In certain examples, the operations of block 2005 may be performed by a receiver 1110 as described with reference to FIG. 11, a transceiver 1635 and antenna(s) 1640 described with reference to FIG. 16, or a transceiver 1735 and antenna(s) 1740 described with reference to FIG. 17. In some examples the receiving may be in cooperation with a wireless communications manager 1120 as described with reference to FIG. 11, 16, or 17, including a superposition coding preamble interpreter 1140 as described with reference to FIG. 11, 14, or 15.

At block 2010, the device may determine that a transmitter device associated with the received preamble signal is associated with the second RAT based at least in part on identifying a signature in the received preamble signal as described herein with reference to FIGS. 2-10. For example, the device may correlate the received preamble signal to a signature associated with a second RAT, which may provide a determination that the received preamble was transmitted according to protocols of the second RAT. In some examples, the operations of block 2010 may be performed by the RAT determiner 1430 as described herein with reference to FIG. 14 or 15.

Figure 21:
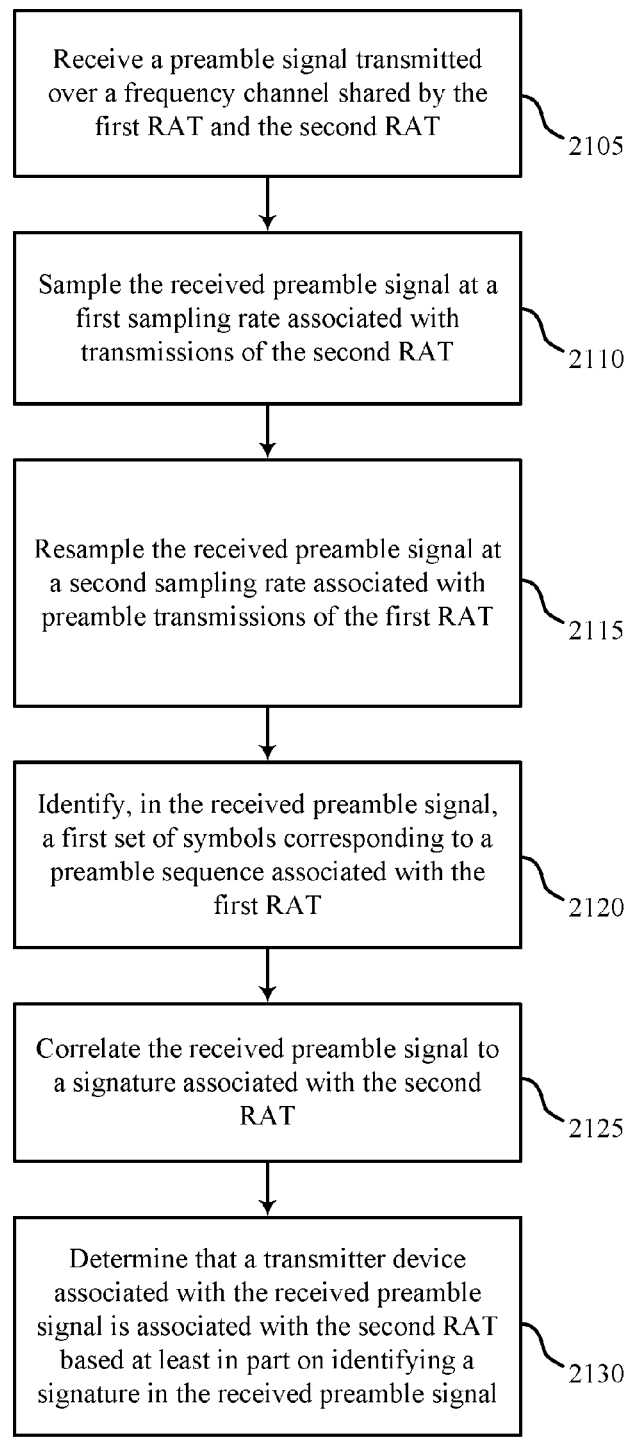
FIG. 21 shows a flowchart illustrating a method for processing a superposition coding based preamble, in accordance with aspects of the present disclosure.

FIG. 21 shows a flowchart illustrating a method 2100 for processing a superposition coding based preamble, in accordance with aspects of the present disclosure. The operations of method 2000 may be implemented by a device, or its components, such as a wireless communications device 1105 described with reference to FIG. 11, a UE 115 as described with reference to FIG. 1, 2, or 16, or a base station 105 as described with reference to FIG. 1, 2, or 17. For example, the operations of method 2000 may be performed by a wireless communications manager 1120 as described with reference to FIG. 11, 16, or 17, including operations by a superposition coding preamble interpreter 1140 described with reference to FIG. 11, 14, or 15. In some examples, a device may execute a set of codes to control the functional elements of the device to perform the functions described below. Additionally or alternatively, the device may perform aspects the functions described below using special-purpose hardware.

At block 2105, the device may receive a preamble signal transmitted over a frequency channel shared by a first RAT and a second RAT. The preamble signal may a predetermined preamble time duration associated with the first RAT, and may identifiable by the first RAT and the second RAT as described herein with reference to FIGS. 2-10. For example, the preamble signal may have a first set of symbols corresponding to a preamble sequence associated with the first RAT and a second set of symbols corresponding to a signature associated with the second RAT. In some examples, the operations of block 2005 may be performed by a receiver 1110 as described with reference to FIG. 11, a transceiver 1635 and antenna(s) 1640 described with reference to FIG. 16, or a transceiver 1735 and antenna(s) 1740 described with reference to FIG. 17. In some examples the receiving may be in cooperation with a wireless communications manager 1120 as described with reference to FIG. 11, 16, or 17, including a superposition coding preamble interpreter 1140 as described with reference to FIG. 11, 14, or 15.

At block 2110, the device may sample the received preamble at a first sampling rate associated with transmissions of the second RAT, as described with reference to FIGS. 2-10. In some examples, at least a portion the operations of block 2110 may be performed by a receiver 1110 as described with reference to FIG. 11, a transceiver 1635 as described with reference to FIG. 16, or a transceiver 1735 as described with reference to FIG. 17. Additionally or alternatively, in some examples at least a portion of the sampling of block 2110 may be performed by a wireless communications manager 1120 as described with reference to FIG. 11, 16, or 17, including a superposition coding preamble interpreter 1140 as described with reference to FIG. 11, 14, or 15. In some examples, at least a portion of the sampling may be performed by a second RAT symbol interpreter 1420, as described with reference to FIG. 14.

At block 2115, the device may resample the received preamble at a second sampling rate associated with preamble transmissions of the first RAT, as described with reference to FIGS. 2-10. In some examples, at least a portion the operations of block 2115 may be performed by a receiver 1110 as described with reference to FIG. 11, a transceiver 1635 as described with reference to FIG. 16, or a transceiver 1735 as described with reference to FIG. 17. Additionally or alternatively, in some examples at least a portion of the resampling at block 2115 may be performed by a wireless communications manager 1120 as described with reference to FIG. 11, 16, or 17, including a superposition coding preamble interpreter 1140 as described with reference to FIG. 11, 14, or 15. For example, at least a portion of the resampling at block 2115 may be performed by a resampler 1510 as described with reference to FIG. 15.

At block 2120, the device may identify, in the received preamble signal, the first set of symbols corresponding to a preamble sequence associated with the first RAT. In some examples at least a portion of the identifying at block 2120 may be performed by a wireless communications manager 1120 as described with reference to FIG. 11, 16, or 17, including a superposition coding preamble interpreter 1140 as described with reference to FIG. 11, 14, or 15. In some examples, at least a portion of the identifying may be performed by a first RAT symbol interpreter 1410 described with reference to FIG. 14 or a WLAN preamble detector 1530 described with reference to FIG. 15.

At block 2125, the device may correlate the received preamble signal to a signature associated with the second RAT. In some examples at least a portion of the correlating at block 2125 may be performed by a wireless communications manager 1120 as described with reference to FIG. 11, 16, or 17, including a superposition coding preamble interpreter 1140 as described with reference to FIG. 11, 14, or 15. In some examples, at least a portion of the correlating may be performed by a second RAT symbol interpreter 1420, as described with reference to FIG. 14, an LTE-U signature identifier 1540 described with reference to FIG. 15, and/or a RAT determiner 1430 described with reference to FIG. 14 or 15.

At block 2130, the device may determine that a transmitter device associated with the received preamble signal is associated with the second RAT based at least in part on identifying a signature in the received preamble signal as described herein with reference to FIGS. 2-10. For example, the device may correlate the received preamble signal to a signature associated with a second RAT, which may provide a determination that the received preamble was transmitted according to protocols of the second RAT. In some examples, the operations of block 2130 may be performed by the RAT determiner 1430 as described herein with reference to FIG. 14 or 15.

Thus, methods 1800, 1900, 2000, and 2100 may provide for superposition coding for a preamble. It should be noted that methods 1800, 1900, 2000, and 2100 describe possible implementation, and that the operations and the steps may be rearranged or otherwise modified such that other implementations are possible. In some examples, aspects from two or more of the methods 1800, 1900, 2000, and 2100 may be combined.

The detailed description set forth above in connection with the appended drawings describes exemplary configurations and does not represent all the examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication, comprising:
generating a preamble signal comprising a first set of symbols and a second set of symbols, wherein the first set of symbols correspond to a preamble sequence associated with a first radio access technology (RAT) mapped to a first set of subcarriers associated with pilot symbols for the preamble sequence, and the second set of symbols correspond to a signature associated with a second RAT mapped to a second set of subcarriers, the second set of subcarriers comprising one or more subcarrier frequencies in between respective subcarriers of the first set of subcarriers, and wherein the first set of symbols is identifiable to both the first RAT and the second RAT and the second set of symbols is identifiable to the second RAT; and
transmitting the preamble signal over a frequency channel shared by the first RAT and the second RAT.

2. The method of claim 1, wherein the generating comprises:
performing a frequency domain superposition of the first set of symbols and the second set of symbols to obtain a frequency domain signal; and
performing a frequency domain to time domain transform on the frequency domain signal.

3. The method of claim 2, wherein the generating further comprises:
applying a gain ratio to the second set of symbols prior to the performing the frequency domain superposition.

4. The method of claim 1, wherein the first set of subcarriers comprises a subset of subcarriers having a first subcarrier spacing associated with transmissions via the first RAT, and wherein the second set of subcarriers comprises one or more subcarriers having a second subcarrier spacing smaller than the first subcarrier spacing.

5. The method of claim 1, wherein the generating comprises:
resampling the preamble signal to a sampling frequency associated with transmissions of the second RAT.

6. The method of claim 5, wherein the sampling frequency associated with transmissions of the second RAT is different than a sampling frequency associated with transmissions of the first RAT.

7. The method of claim 1, wherein the signature is selected from a set of predefined signatures having low cross-correlations with each other.

8. The method of claim 7, wherein the selecting the signature from the set of predefined signatures is based at least in part on a device identifier associated with a transmitter device for the second RAT, a cell identifier associated with a cell of the second RAT, a supported release version of the second RAT, a power class of the transmitter device, a transmission length, a public land mobile network ID, a channel number or any combination thereof.

9. The method of claim 7, wherein the set of predefined signatures comprises one or more Chu sequences.

10. The method of claim 1, wherein the generating comprises:
generating the signature based at least in part on a pseudo-noise (PN) function.

11. The method of claim 1, wherein a transmit power for the transmitting is selected based at least in part on a predefined transmit power level for the preamble sequence associated with the first RAT.

12. The method of claim 1, wherein the first RAT comprises a wireless local area network (WLAN) RAT and the first set of symbols comprises pilot symbols for one or both of a short training field (STF) or a long training field (LTF) for the WLAN RAT, and wherein the second RAT comprises a Long Term Evolution (LTE) RAT or an LTE-Advanced (LTE-A) RAT.

13. A method of wireless communication, comprising:
receiving a preamble signal transmitted over a shared frequency channel, the preamble signal having a predetermined preamble time duration associated with a first radio access technology (RAT), the preamble signal having a first set of symbols corresponding to a preamble sequence associated with the first RAT mapped to a first set of subcarriers associated with pilot symbols for the preamble sequence, and a second set of symbols corresponding to a signature associated with the second RAT mapped to a second set of subcarriers, the second set of subcarriers comprising one or more subcarrier frequencies in between respective subcarriers of the first set of subcarriers; and determining that a transmitter device associated with the received preamble signal is associated with the second RAT based at least in part on the signature in the received preamble signal.

14. The method of claim 13, wherein the determining comprises:

sampling the received preamble signal at a first sampling rate associated with transmissions of the second RAT; and resampling the received preamble signal at a second sampling rate associated with preamble transmissions of the first RAT.

15. The method of claim 13, wherein the determining comprises:

performing a frequency domain correlation of the received preamble signal to the signature associated with the second RAT.

16. The method of claim 15, wherein performing the frequency domain correlation comprises:

comparing the frequency domain correlation to a threshold.

17. The method of claim 16, wherein the threshold is determined based at least in part on a signal-to-noise ratio (SNR) or a signal-to-interference-plus-noise ratio (SINR) of the received preamble signal.

18. The method of claim 13, wherein the first set of symbols comprises pilot symbols for one or both of a short training field (STF) or a long training field (LTF) for a wireless local area network (WLAN) RAT, and wherein the determining that the transmitter device associated with the received preamble signal is associated with the second RAT is based at least in part on identifying the second set of symbols in the STF, the LTF, or any combination thereof.

19. An apparatus for wireless communication, comprising:

a processor;

memory in electronic communication with the processor; and instructions stored in the memory and operable, when executed by the processor, to cause the apparatus to:

generate a preamble signal comprising a first set of symbols and a second set of symbols, wherein the first set of symbols correspond to a preamble sequence associated with a first radio access technology (RAT) mapped to a first set of subcarriers associated with pilot symbols for the preamble sequence, and the second set of symbols correspond to a signature associated with a second RAT mapped to a second set of subcarriers, the second set of subcarriers comprising one or more subcarrier frequencies in between respective subcarriers of the first set of subcarriers, and wherein the first set of symbols is identifiable to both the first RAT and the second RAT and the second set of symbols is identifiable to the second RAT; and transmit the preamble signal over a frequency channel shared by the first RAT and the second RAT.

20. The apparatus of claim 19, wherein the instructions to generate the preamble signal are operable to cause the apparatus to:

perform a frequency domain superposition of the first set of symbols and the second set of symbols to obtain a frequency domain signal; and perform a frequency domain to time domain transform on the frequency domain signal.

21. The apparatus of claim 20, wherein the instructions to generate the preamble signal are operable to cause the apparatus to:

apply a gain ratio to the second set of symbols prior to the performing the frequency domain superposition.

22. The apparatus of claim 19, wherein the instructions to generate the preamble signal are operable to cause the apparatus to:

resample the preamble signal to a sampling frequency associated with transmissions of the second RAT.

23. The apparatus of claim 19, wherein the signature is selected from a set of predefined signatures having low cross-correlations with each other.

24. The apparatus of claim 23, wherein the instructions to select the signature from the set of predefined signatures are operable based at least in part on a device identifier associated with a transmitter device for the second RAT, a cell identifier associated with a cell of the second RAT, a supported release version of the second RAT, a power class of the transmitter device, a transmission length, a public land mobile network ID, a channel number or any combination thereof.

25. The apparatus of claim 19, wherein the instructions are operable to cause the apparatus to:

generate the signature based at least in part on a pseudo-noise (PN) function.

26. An apparatus for wireless communication, comprising:

a processor;

memory in electronic communication with the processor; and instructions stored in the memory and operable, when executed by the processor, to cause the apparatus to:

receive a preamble signal transmitted over a shared frequency channel, the preamble signal having a predetermined preamble time duration associated with a first radio access technology (RAT), the preamble signal having a first set of symbols corresponding to a preamble sequence associated with the first RAT mapped to a first set of subcarriers associated with pilot symbols for the preamble sequence, and a second set of symbols corresponding to a signature associated with the second RAT mapped to a second set of subcarriers, the second set of subcarriers comprising one or more subcarrier frequencies in between respective subcarriers of the first set of subcarriers; and determine that a transmitter device associated with the received preamble signal is associated with the second RAT based at least in part on the signature in the received preamble signal.

27. The apparatus of claim 26, wherein the instructions to determine that the transmitter device is associated with the second RAT are operable to cause the apparatus to:

sample the received preamble signal at a first sampling rate associated with transmissions of the second RAT; and resample the received preamble signal at a second sampling rate associated with preamble transmissions of the first RAT.

28. The apparatus of claim 26, wherein the instructions to determine that the transmitter device is associated with the second RAT are operable to cause the apparatus to:

perform a frequency domain correlation of the received preamble signal to the signature.

29. The apparatus of claim 19, wherein the first set of subcarriers comprises a subset of subcarriers having a first subcarrier spacing associated with transmissions via the first RAT, and wherein the second set of subcarriers comprises one or more subcarriers having a second subcarrier spacing smaller than the first subcarrier spacing.

30. The apparatus of claim 26, wherein the first set of symbols comprises pilot symbols for one or both of a short training field (STF) or a long training field (LTF) for a wireless local area network (WLAN) RAT, and wherein the determining that the transmitter device associated with the received preamble signal is associated with the second RAT is based at least in part on identifying the second set of symbols in the STF, the LTF, or any combination thereof.

* * * * *